FRANCIS R. ROGERS
HOWARD L. McCOMBS JR.
MIKE SNIDER
INVENTORS

BY
Gordon N. Cheney
AGENT

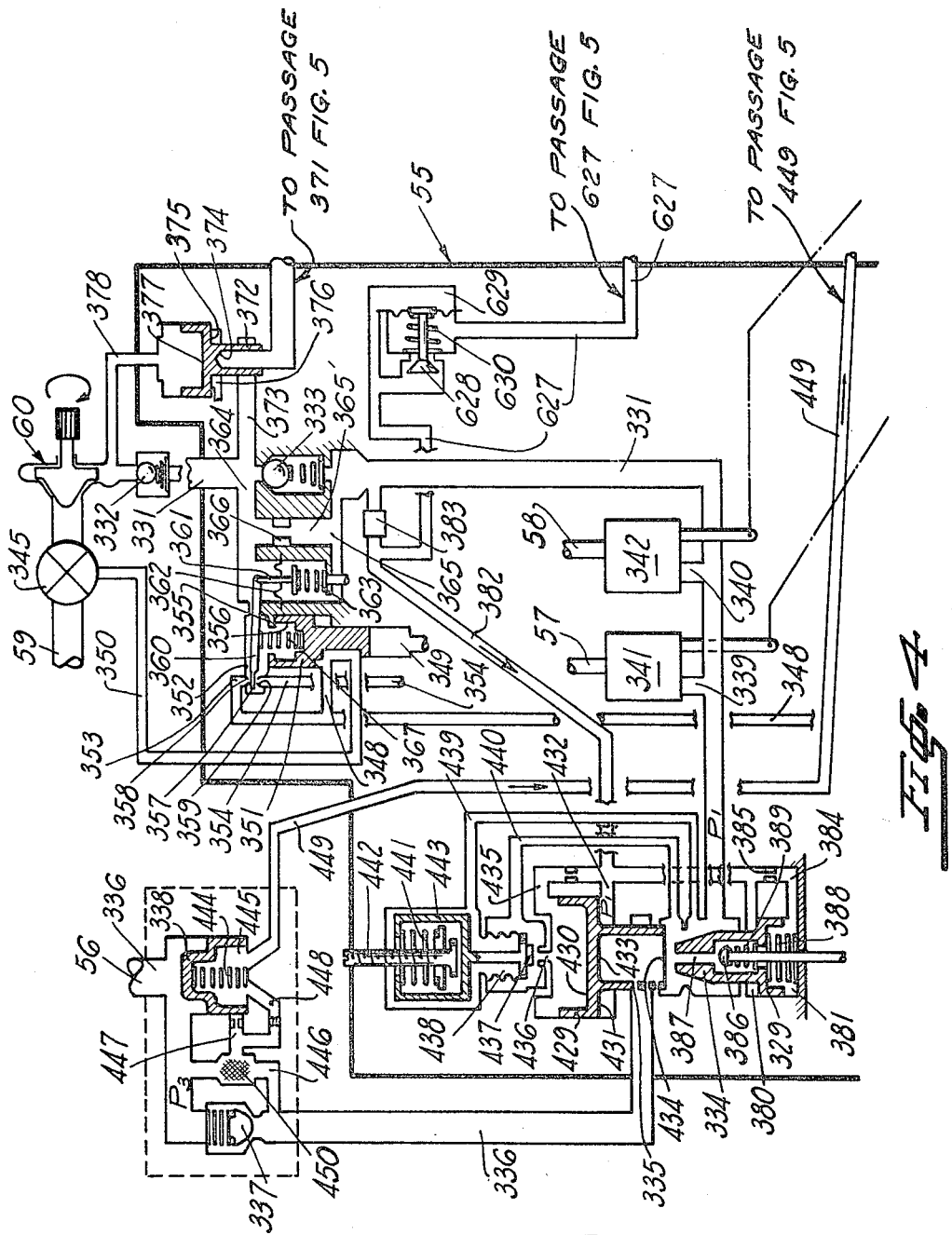

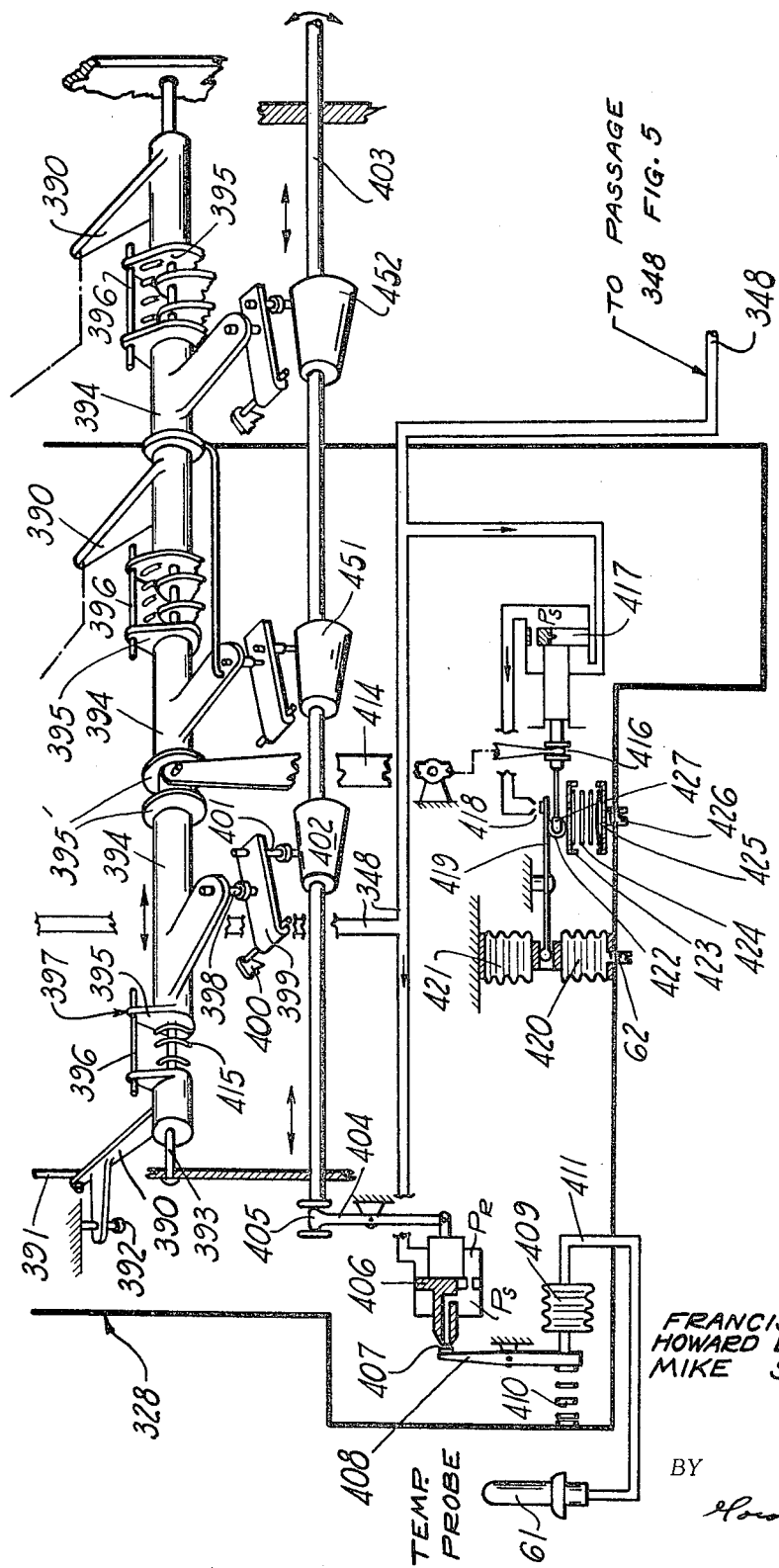

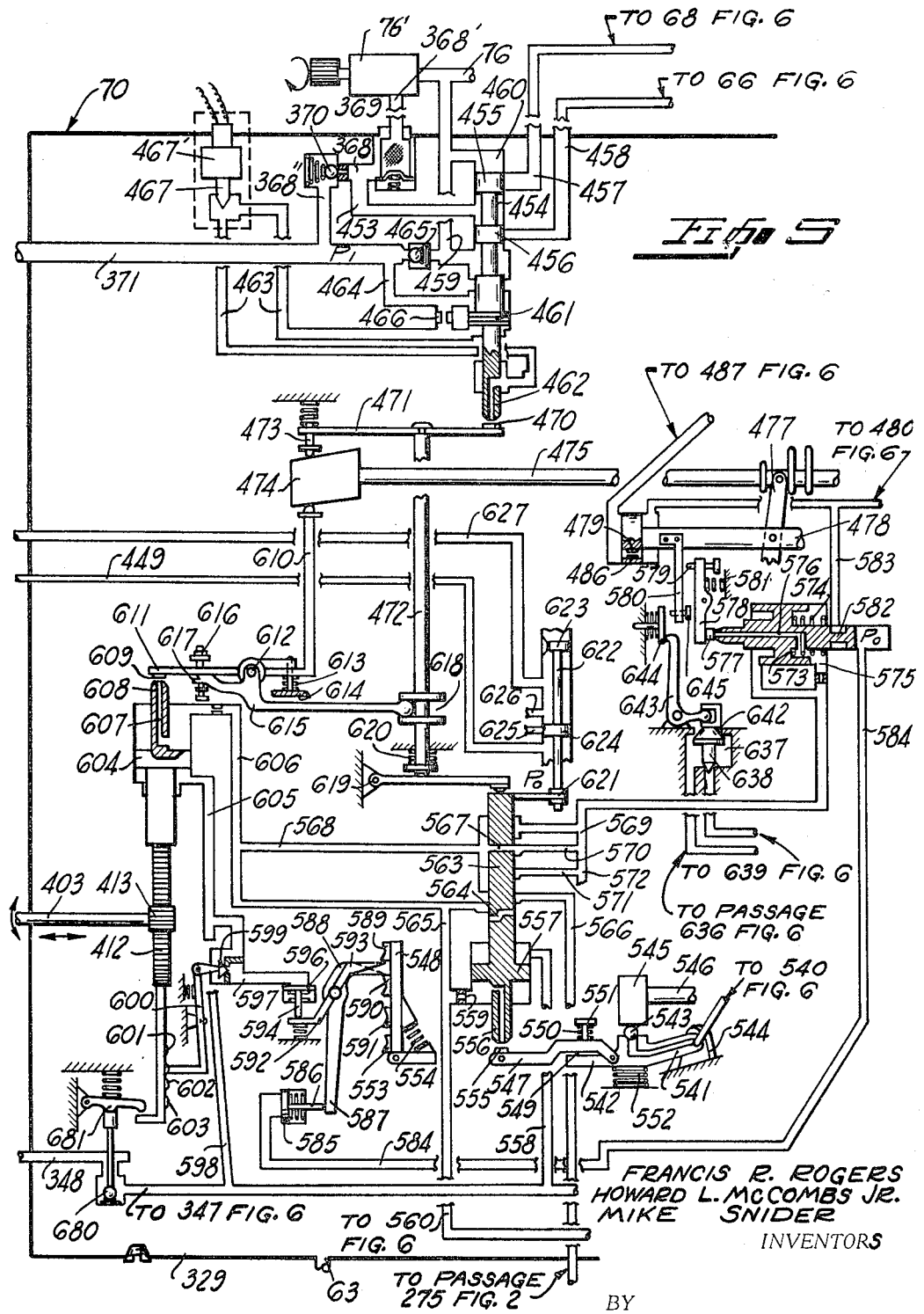

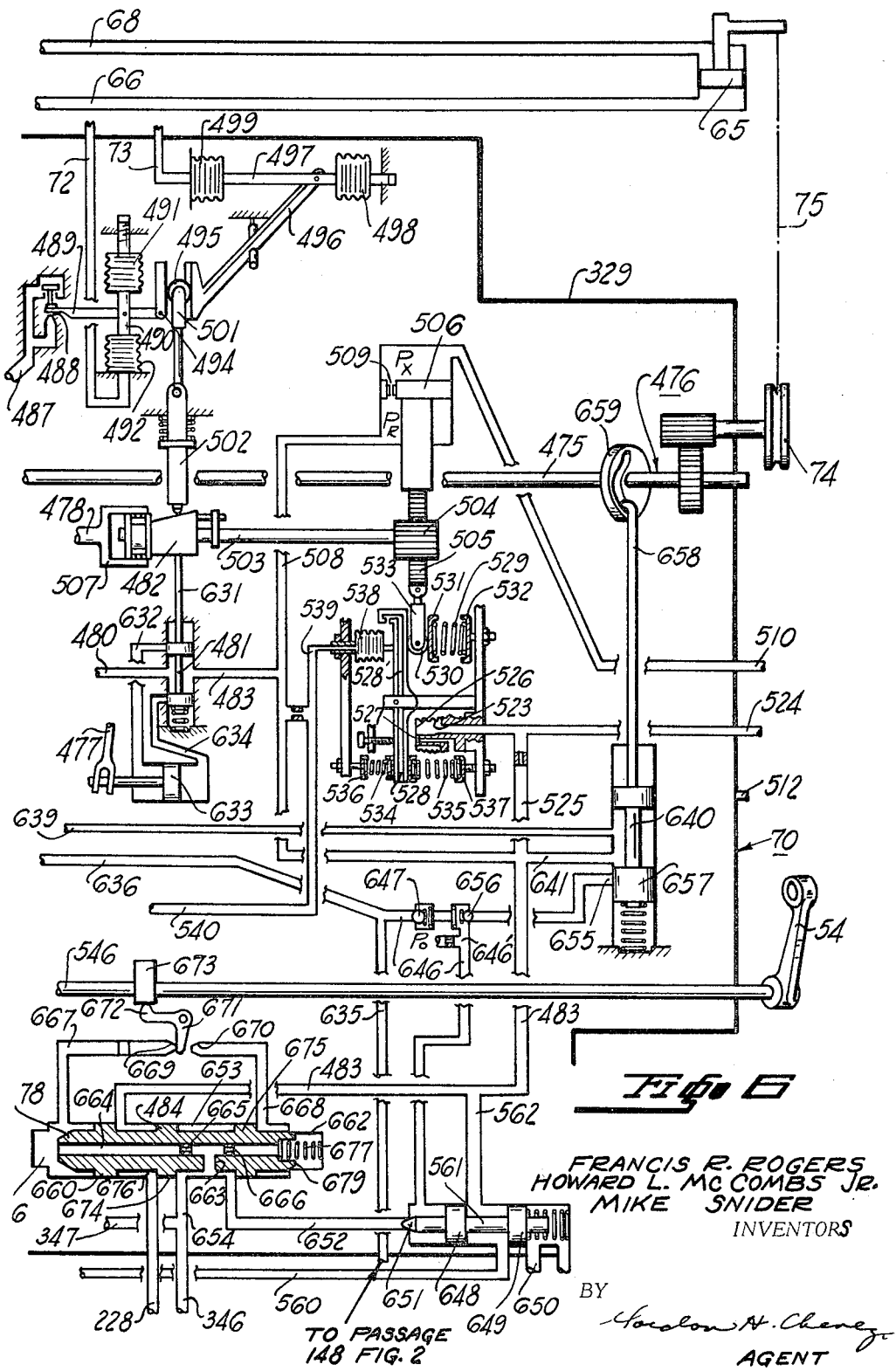

United States Patent Office 3,283,500
Patented Nov. 8, 1966

1

3,283,500
FUEL FEED AND POWER CONTROL APPARATUS FOR COMBUSTION ENGINES
Francis R. Rogers, Howard L. McCombs, Jr., and Mike Snider, all of South Bend, Ind., assignors to The Bendix Corporation, a corporation of Delaware
Original application Sept. 13, 1963, Ser. No. 308,799, now Patent No. 3,232,053, dated Feb. 1, 1966. Divided and this application Oct. 22, 1965, Ser. No. 501,941
5 Claims. (Cl. 60—39.28)

This is a division of application Serial No. 308,799 filed September 13, 1963 now U.S. Patent No. 3,232,053 issued February 1, 1966.

This invention relates in general to control apparatus for a combustion engine and, in particular, to fuel control apparatus for a gas turbine engine having a variable area exhaust nozzle.

It is an object of the present invention to provide a fuel control for reliably and accurately controlling the flow of fuel to a combustion engine as a function of predetermined engine operating conditions.

It is another object of the present invention to provide an easily serviced likhtweight fuel control for an aircraft combustion engine.

It is still another object of the present invention to provide fuel feed and power control apparatus having a main fuel control, an afterburner fuel control and a nozzle area control operative together in response to a plurality of variable engine operating conditions to maintain fuel feed and exhaust nozzle area within prescribed limits over the entire operating range of the engine as a function of the variable engine operating conditions.

It is an important object of the present invention to provide a fuel control having a mechanical computer section and a fuel metering section for an aircraft gas turbine engine which fuel metering section operates on the basis of a constant pressure head across a variable metering valve area and which computer section operates to receive a plurality of input signals representative of variable engine operating conditions such as engine throttle lever request, engine speed, compressor discharge pressure and compressor inlet air pressure and temperature and mechanically computed control signals therefrom to thereby establish a metering valve area which is a function of one or more of said variable engine operating conditions.

It is yet another object of the present invention to provide fuel feed and power control apparatus for an aircraft gas turbine engine which may be easily modified for operation with different engines of the same type but with varying operating characteristics which must be compensated for by the fuel feed and power control apparatus.

Other objects and advantages of the present invention will become apparent from the following description taken in conjunction with the accompanying drawings wherein:

FIGURE 4 is a schematic representation showing structural details of a portion of the afterburner fuel control shown in block form in FIGURE 1;

FIGURE 4a is a schematic representation showing

Figure 1:
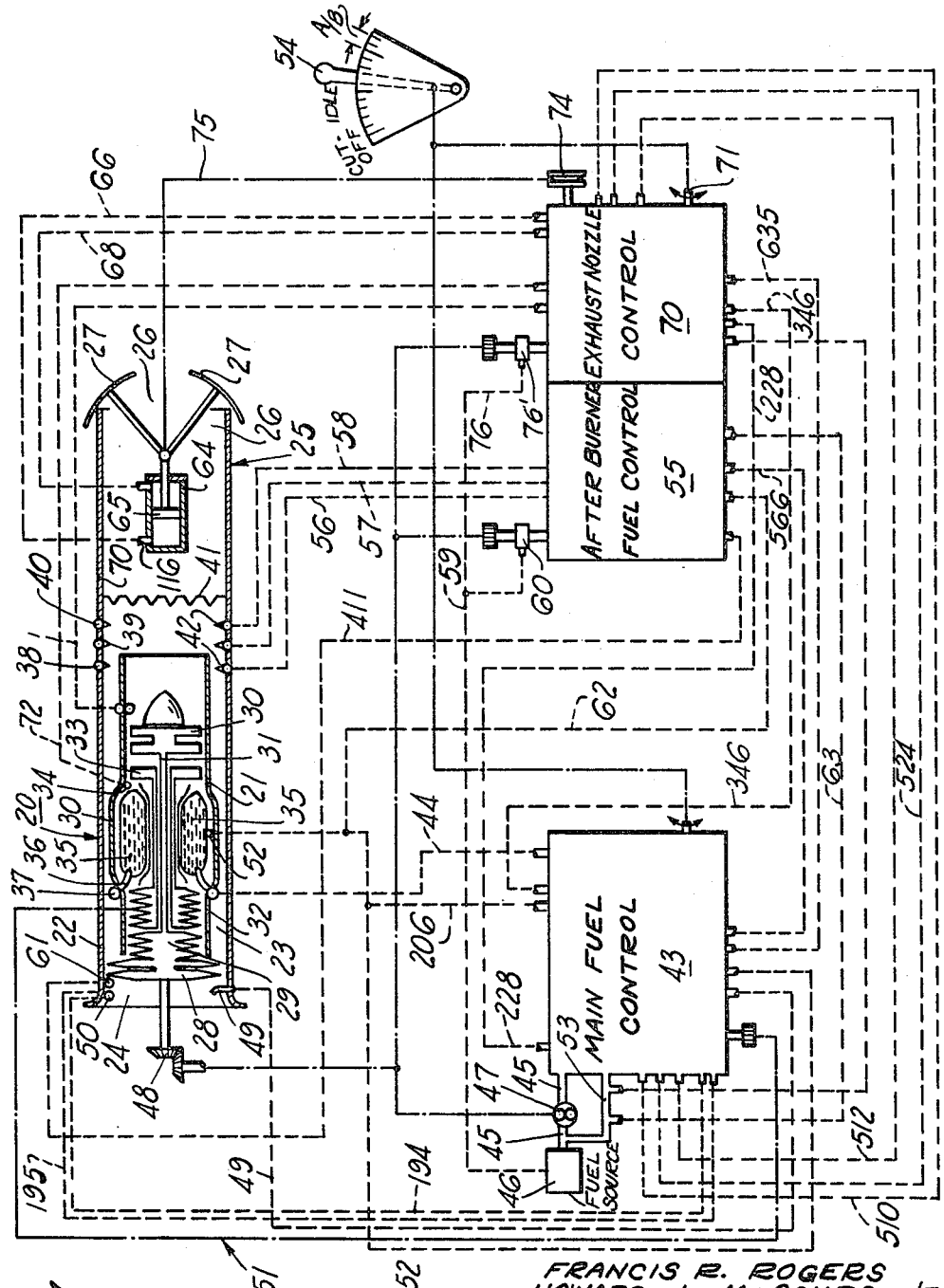
FIGURE 1 is a schematic representation of an aircraft jet engine embodying the present invention wherein the component sections of the present invention are shown in block form.

2 structural details of the remaining portion of the afterburner fuel control shown in block form in FIGURE 1;

FIGURE 5 is a schematic representation showing structural details of a portion of the exhaust nozzle area control shown in block form in FIGURE 1; and FIGURE 6 is a schematic representation showing structural details of the remaining portion of the exhaust nozzle area control shown in block form in FIGURE 1.

Referring to FIGURE 1, numeral 20 represents an aircraft gas turbine engine of the turbo-fan type which is provided with inner and outer casings 21 and 22, respectively, which form an annular air duct 23 leading from air inlet 24 to an afterburner section 25 of casing 22 which terminates in a variable area exhaust nozzle 26 having movable exhaust nozzle gates 27. A fan 28 and low pressure air compressor 29 are secured to and driven by a dual turbine 30 via a shaft 31 rotatably carried in bearings, not shown. A high pressure air compressor 32 in series with compressor 29 is secured to and driven by a turbine 33 via a shaft 34 concentric with shaft 31 and rotatably carried by bearings, now shown, for independent rotation relative to shaft 31. A plurality of combustion chambers 35 is supplied fuel by fuel nozzles 36 connected to annnular fuel manifold 37. A plurality of annular afterburner fuel manifold 38, 39 and 40 are arranged to inject fuel into duct 23 and/or casing 22 upstream from flame holders 41 which are secured to casing 22.

Air flows into inlet 24 and is compressed and displaced rearwardly into duct 23 as well as low pressure air compressor 29 by fan 28, the compressor 29 pressurizing its associated air flow and delivering the same to the high pressure air compressor 32 which, in turn, further pressurizes the air and discharges to combustion chambers 35 wherein the mixture of fuel and air is burned to form a hot motive gas which flows through turbines 33 and 30 driving the same. The hot motive gas is discharged from turbine 30 and together with air exhausted from duct 23 flows through exhaust nozzle 26 and expands to the atmosphere thereby providing a propelling thrust. Fuel nozzles 42 connected to afterburner fuel manifolds 38, 39 and 40 are arranged to inject fuel into gas downstream of the turbine 33 where the injected fuel is burned to elevate the temperature of the gas thereby providing a corresponding increase in thrust.

Metered fuel flow is supplied to the fuel manifold 37 from a main fuel control 43 via a fuel conduit 44 connected therebetween. The main fuel control 43 is supplied pressurized fuel via a fuel supply conduit 45 leading to a fuel tank 46 and containing an engine driven positive displacement fuel pump 47. A conventional gear and shafting arrangement 48 provides a driving connection between the pump 47 and engine shaft 31. Various control input signals associated with engine operation are supplied to the main fuel control 43 which establishes metered fuel flow to conduit 44 as a function of the various input signals and which transmits computed pressure signals to other component sections of the system as will be described hereinafter. Among the control input signals are compressor inlet air pressure $P_1$ and temperature $T_1$ which are transmitted to the main fuel control 43 via conduit 49 and temperature pick-up unit 50, respectively, suitably disposed in air inlet 24. The rotational speed $N_2$ of the high pressure air compressor 32 is transmitted to the main fuel control 43 via conventional gearing and shafting arrangement generally indicated by numeral 51. High pressure compressor discharge air pressure $P_c$ is transmitted to the main fuel control via conduit 52. A drain passage 53 communicates the interior of the main fuel control 43 with fuel conduit 45 at fuel pump inlet or drain pressure $P_0$. A manually operative throttle lever 54 movable between cut-off and a maximum afterburner position provides a power request signal to the main fuel control 43.

Metered fuel flow is supplied to the afterburner fuel manifolds 38, 39 and 40 from an afterburner fuel control 55 via fuel conduits 56, 57 and 58, respectively, connected therebetween. The afterburner fuel control 55 is supplied pressurized fuel via a fuel supply conduit 59 leading to fuel tank 46 and containing an engine driven centrifugal fuel pump 60. Among the control input signals supplied to the afterburner fuel control 55 are compressor inlet temperature $T_i$ and compressor discharge air pressure $P_c$ which are supplied via temperature sensing unit 61 and conduit 62, respectively. A drain passage 63 communicates the interior of afterburner fuel control 55 with conduit 53 at fuel pump inlet pressure $P_0$.

The position of the variable area gates 27 is controlled by a power unit which includes a cylinder 64 and a piston 65 slidable therein. Fluid pressure is supplied to opposite sides of the piston 65 via passages 66 and 68 leading to an exhaust nozzle control 70 which controls the flow of fluid therethrough as a function of various input control signals. The input control signals include the position of throttle lever 54 received via shaft 71 and air pressure $P_{T4}$ and $P_{T7}$ upstream and downstream of turbines 33 and 30, respectively, via passages 72 and 73, respectively. The position of gates 27 is transmitted to nozzle control 70 via mechanical feedback mechanism including a spring loaded pulley 74 and flexible link 75 connecting pulley 74 and piston 65. A conduit 76 containing an engine driven fuel pump 76' communicates pressurized fuel to exhaust nozzle control 70 from fuel source 46.

Figure 2:
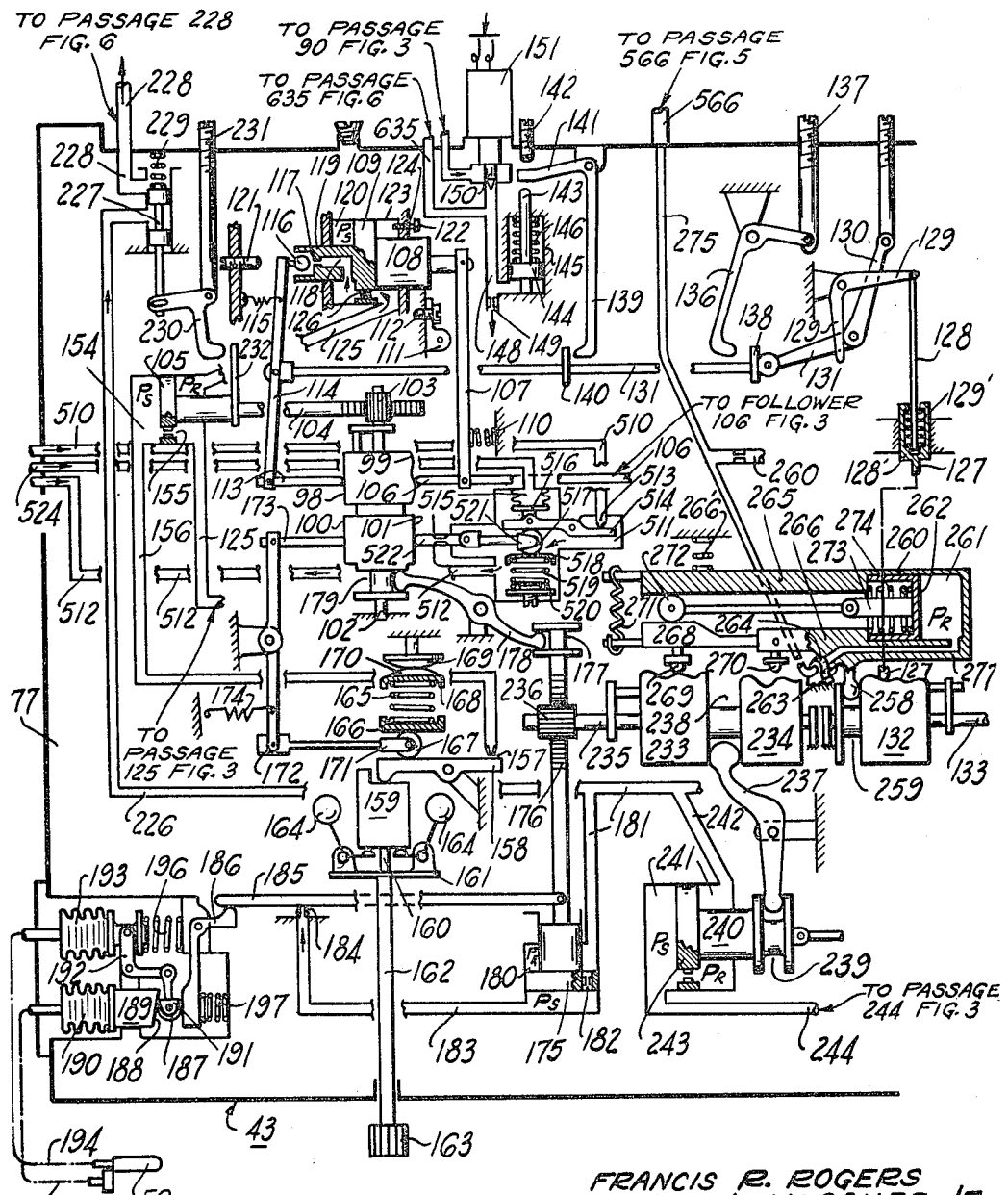
FIGURE 2 is a schematic representation showing structural details of a portion of the main fuel control shown in block form in FIGURE 1.
Figure 3:
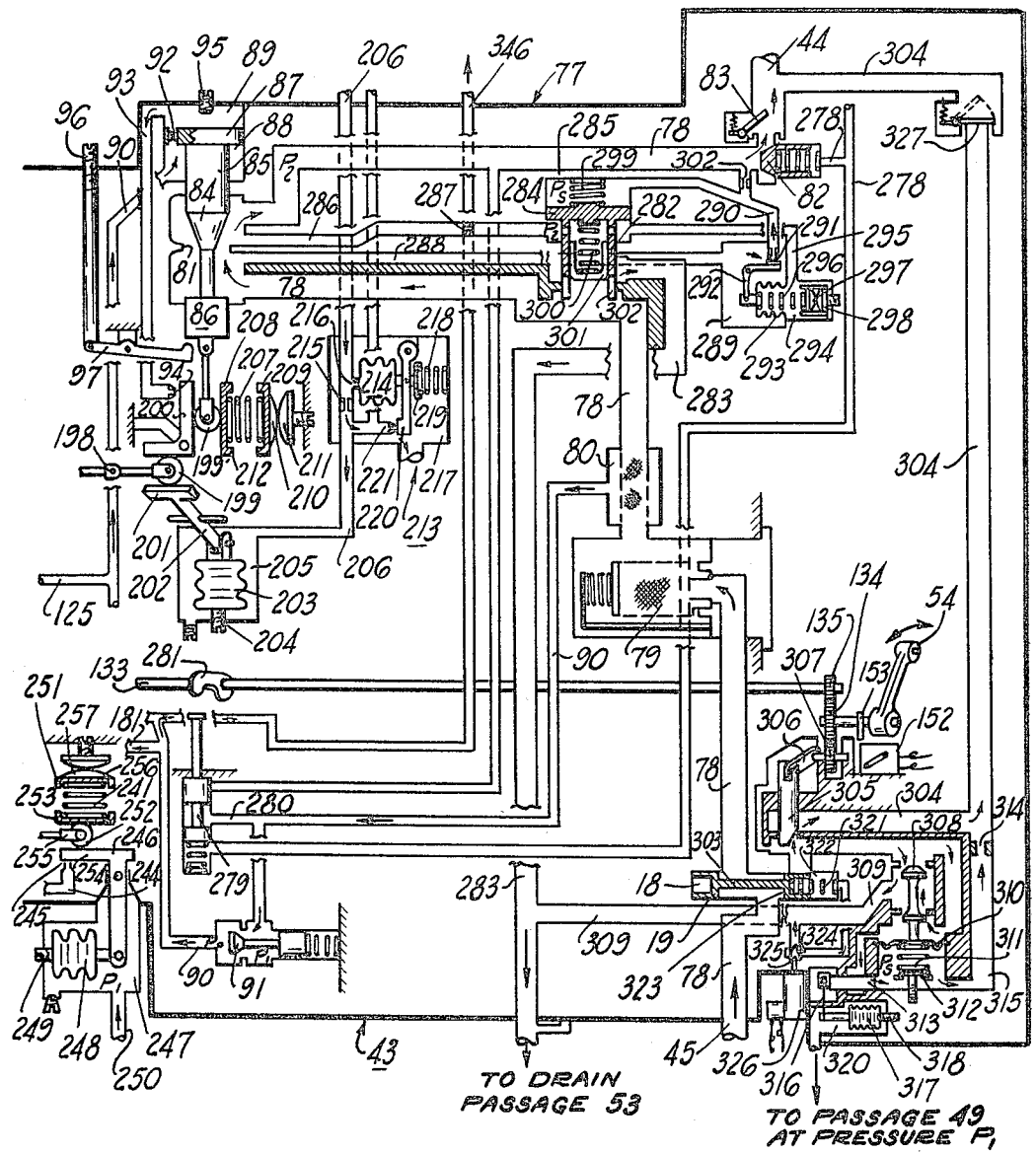
FIGURE 3 is a schematic representation showing structural details of the remaining portion of the main fuel control shown in block form in FIGURE 1.

Referring to FIGURES 2 and 3 which together illustrate the various component portions of the main fuel control 43, numeral 77 designates a casing through which fuel flows from supply conduit 45 to fuel conduit 44 via a flow conduit 78 containing fuel filters 79 and 80, a variable area orifice 81, a fuel pressure responsive spring loaded valve 82 and a spring loaded check valve 83. A metering valve 84 operatively connected to orifice 81 is provided with opposite end portions 85 and 86 slidably carried in casing 77 and, at one end, is provided with an integral servo piston 87 slidably carried in casing 77 and together with casing 77 defining variable volume chambers 88 and 89. Fuel at a predetermined constant regulated fuel pressure $P_r$ is supplied to chamber 88 via a conduit 90 connected to flow conduit 78 and provided with a conventional spring loaded pressure responsive pressure regulating valve 91 which, depending upon the spring load applied thereto, regulates the pressure of the fuel downstream therefrom at a predetermined constant value $P_r$. Fuel flows from chamber 88 to chamber 89 via a fixed area restriction 92 fixedly secured in piston 87 and then flows to the interior of casing 77 at drain pressure $P_0$ via a passage 93. The flow through passage 93 and thus the pressure drop across piston 87 is controlled by a variable area orifice 94 which is operatively connected to the discharge end of passage 93. It will be noted that the piston 87 has a relatively large area exposed to the lower fuel pressure in chamber 89 derived from pressure $P_r$ such that piston 87 is stabilized when the inverse ratio of fuel pressures thereacross equals the area ratio of piston 87 and is moving when said ratio of pressures is upset. An adjustable maximum flow stop 95 threadedly engaged with casing 77 is adapted to engage piston 87 thereby limiting movement of metering valve 84 in an opening direction. An adjustable minimum flow stop which includes a threaded member 96 threadedly engaged with casing 77 and a lever member 97 pivotally secured to casing 77 and member 96 is adapted to engage end portion 86 thereby limiting movement of metering valve 84 in a closing direction.

The position of metering valve 84 and thus fuel flow through conduit 44 to the engine is regulated as a function of the speed $N_2$ of high pressure air compressor 32 by a governor and acceleration cam having separate circumferential portions 98 and 99 which are contoured radially as predetermined functions of high pressure air compressor speed $N_2$ to provide corresponding governing and acceleration fuel flows, respectively. The cam portion 99 is contoured axially as a function of compressor inlet air temperature $T_i$ to provide temperature compensation for acceleration fuel flow.

A second cam fixedly secured to cam portions 98 and 99 is provided with separate circumferential portions 100 and 101 which are contoured radially as predetermined function of high pressure air compressor speed $N_2$.

The governor and acceleration cam and second cam secured thereto are slidably mounted for axial movement on a shaft 102 and are rotatable with shaft 102 which is journalled at one end in casing 77 and which is provided with an integral pinion 103 at the opposite end. The pinion 103 is engaged by a rack 104 fixedly secured to a servo piston 105 which serves to rotate pinion 103 and shaft 102 as a function of high pressure compressor speed $N_2$ in response to movement of piston 105. A cam follower 106 is urged into engagement with portion 99 of the governor and acceleration cam by a lever 107 pivotally connected at one end to the cam follower 106 and at the opposite end pivotally connected to a reduced diameter extension 108 of a servo piston 109. A spring 110 suitably interposed between lever 107 and casing 77 serves to bias the lever 107 to effect engagement of follower 106 with cam portion 99 when the lever 107 is biased out of engagement with an adjustable fulcrum or abutment member 111 by servo piston 109 as shown in FIGURE 2. The fulcrum or abutment member 111 is adjustably secured to casing 77 by a screw 112 threadedly engaged therewith. A cam follower 113 is urged into engagement with cam portion 98 by a lever 114 pivotally connected at one end to follower 113. A tension spring 115 connected to casing 77 and lever 114 serves to load lever 114 in a counterclockwise direction. The opposite end of lever 114 is adapted to engage a ball servo valve 116 which cooperates with a valve seat 117 formed at the discharge end of a passage 118 defined by an annular extension 119 integral with servo piston 109 which annular extension extends through an opening 120 in casing 77. An adjustable fixed stop 121 threadedly engaged with casing 77 is enagageable with lever 114 to thereby limit movement of the same. The reduced diameter section 108 extends from the opposite side of servo piston 109 through an opening 122 in casing 77. The servo piston 109 is slidably carried in a chamber 123 and arranged to engage a stop 124 which engagement permits the lever 107 to occupy a slight spaced relationship relative to adjustable fulcrum 111 when the follower 106 occupies a position corresponding to the maximum depression of contoured portion 99. Fuel at constant regulated servo pressure $P_r$ is supplied to chamber 123 via a passage 125 leading from conduit 90 and flows through a restriction 126 fixedly secured in piston 109 to chamber 123 on the opposite side of piston 109 from which it flows through passage 118 to the interior of casing 77 at drain pressure $P_0$. The fuel pressure $P_s$ in chamber 123 on the downstream side of restriction 126 is controlled by the ball valve 116. The larger and smaller effective areas of piston 109 exposed to fuel pressures $P_s$ and $P_r$, respectively, have a predetermined fixed area ratio which requires that a corresponding ratio of pressures $P_s$ and $P_r$ be established to stabilize piston 109 at any position in its range of travel. The piston 109 will respond to a variation from the predetermined pressure ratio $P_r/P_s$ and continue to move until the fuel pressure $P_s$ is regulated by the action of ball valve 116 to the value required to establish the predetermined ratio $P_r/P_s$. It will be noted that the servo piston 109 is of the follow-up type which means that, depending upon the direction of movement of ball valve 116 relative to valve seat 117, the piston 109 will move in the same direction in response to the change in pressure $P_s$ until the position of valve seat 117 relative to ball valve 116 is such that the pressure $P_s$ required to stabilize piston 109 is again re-established. For additional details of the governor and acceleration cam and associated linkage mechanism described above, reference is made to U.S. Patent No. 3,138,926 issued June 30, 1964, in the name of H. L. McCombs, Jr. (common assignee). The position of the ball valve 116 for a fixed position of follower 113 is dependent upon the position of a spring loaded follower 127 attached to lever 114 through a rod 128, a bell crank 129 pivotally secured at one arm to rod 128 and pivotally secured to casing 77 at its midsection, a follower 130 slidably engaged with the other arm of bell crank 129 and pivotally connected to a rod 131 which, in turn, is pivotally connected to lever 114. The follower 127 is responsive to the position of a speed request cam 132 slidably mounted on a shaft 133 and rotatable therewith in response to movement of throttle lever 54. Throttle lever 54 is fixedly secured to a gear 134 which meshes with a gear 135 fixedly secured to the shaft 133. An engine idle speed adjustment includes an adjustable fixed stop 136 pivotally secured to casing 77 and at one end pivotally secured to a rod 137 threadedly engaged with casing 77. The stop 136 is adapted to engage a flange 138 fixedly secured to rod 131 to thereby limit movement of the same in a corresponding direction. The movement of rod 131 in the opposite direction is limited by a stop member 139 which engages a flange 140 fixedly secured to rod 131. The stop member 139 is pivotally secured to casing 77 and provided with an arm 141 which is biased against an adjustable fixed stop 142 threadedly engaged with casing 77 by a rod 143 integral with a piston 144. The piston 144 is slidably carried in a chamber 145 and is biased away from arm 141 by a spring 146 interposed between casing 77 and piston 144 and drain fuel pressure $P_o$ acting against one side of piston 144. The rod 143 is biased against arm 141 by constant regulated fuel pressure $P_r$ which communicates with chamber 145 at the opposite side of piston 144 via a passage 148 leading to conduit 90. The passage 148 is vented to drain fuel pressure $P_o$ via a restriction 149. A normally closed valve 150 in passage 148 is actuated by an electrical solenoid 151 which is energized at a predetermined throttle lever 54 positioned by a switch 152. A cam 153 rotatable with throttle lever 54 serves to activate switch 152 at the predetermined throttle lever position. With valve 150 closed, the fuel at pressure $P_r$ in chamber 147 is permitted to drain to the interior of casing 77 at pressure $P_o$ via restriction 149.

The servo piston 105 which actuates rack 104 is slidably carried in a chamber 154 which receives fuel at constant regulated servo pressure $P_r$ via passage 125 vented thereto. Fuel flows through a restriction 155 fixedly secured in piston 105 to chamber 154 at the opposite side of piston 105 from which the fuel flows through a passage 156 having a variable area valve 157 at the discharge end thereof to the interior of casing 77 at drain pressure $P_o$. The effective flow area of valve 157 is controlled as a function of high pressure compressor speed $N_2$ by a lever 158 pivotally secured to casing 77 and engageable at one end with a bearing member 159 slidably carried on a rod 160 which, in turn, is integral with a rotatable support 161. The support 161 is provided with a shaft 162 having a gear 163 integral thereto which is driven by the high pressure compressor 32 via gearing and shafting 51. A pair of centrifugal weights 164 pivotally secured to support 161 extends into engagement with the bearing member 159 to thereby load the same axially in response to the centrifugal force derived from the rotation of the weights 164. The force applied to lever 158 by bearing member 159 is opposed by a constant reference force derived from a spring 165 which is applied to lever 158 through a plate 166 and roller 167 which contacts plate 166 and lever 158 and rolls therebetween. The opposite end of spring 165 is engaged by a spring retainer 168 provided with temperature responsive discs 169 secured thereto which are supported by a retaining member 170 fixedly secured to casing 77. The discs 169 provide temperature compensation relative to the fuel surrounding spring 165. The roller 167 is pivotally secured to a yoke 171 which, in turn, is pivotally secured to one end of a lever 172. The lever 172 is pivotally secured to casing 77 at its intermediate portion and at its opposite end is pivotally secured to a follower 173 which bears against contoured portion 100. A tension spring 174 connected to casing 77 and lever 172 serves to load the lever 172 in a clockwise direction.

The governor and acceleration cam and second cam secured thereto are actuated axially on shaft 102 as a function of compressor inlet air temperature $T_1$ by a piston 175 integral with a rack 176 which is provided with a retaining annulus 177. One end of a lever 178 pivotally secured to casing 77 is retained by annulus 177 and the opposite end of lever 178 is retained by a retaining annulus 179 formed on the second cam. The piston 175 slides in a chamber 180 to which fuel at regulated servo pressure $P_r$ is supplied via a passage 181. Fuel flows through a restriction 182 fixedly secured in piston 175 to chamber 180 at the opposite side of piston 175 from which the fuel flows to the interior of casing 77 at drain pressure $P_o$ via a passage 183 having a variable area valve 184 at the discharge end thereof. The effective flow area of passage 183 and thus fuel pressure $P_s$ in chamber 180 is varied by valve 184 in response to movement of a lever 185 pivotally connected at one end to rack 176. The opposite end of lever 185 is engaged by an arm 186 pivotally secured to casing 77. The arm 186 is actuated by a roller 187 which rides against a beveled surface 188 formed on a cylindrical member 189 slidably carried by casing 77 and fixedly secured to a movable end of a bellows 190 which is filled with a fluid which expands and contracts axially in response to compressor inlet temperature $T_1$ sensed by unit 50. The roller 187 is rotatably secured to a yoke 191 which is pivotally secured to one end of a bell crank 192. The bell crank 192 is pivotally secured to casing 77 and is pivotally secured at its opposite end to the movable end of a bellows 193 which expands and contracts axially in response to the temperature sensed by a liquid filled tube 194 connected between bellows 193 and temperature unit 50. The tube 194 and a similar tube portion 195 connected between temperature unit and bellows 190 are responsive to the same ambient temperature. However, it is desired to compensate for the effect of the ambient temperature on tube portion 195 such that output motion of arm 186 is a function of compressor inlet Temperature $T_1$ only. To this end, the effect of tube 194 which responds to the ambient temperature and not to compressor inlet temperature $T_1$ serves to compensate for the effect on tube 195 as will be described hereinafter. A preload against bellows 193 is maintained by a spring 196. A spring 197 interposed between casing 77 and arm 186 serves to bias arm 186 against roller 187.

The cam follower 106 which engages contoured portion 99 of the second cam is pivotally secured to a yoke 198 which rotatably carries a roller 199. The roller 199 rolls between one arm of a lever 200 and cross arm 201 of a T-shaped lever 202 which is pivotally secured to casing 77. The opposite end of the T-shaped lever 202 is pivotally secured to the movable end of a bellows 203 which is adjustably secured to casing 77 at its opposite fixed end by a threaded extension 204 threadedly engaged with casing 77. The bellows 203 responds to compressor discharge pressure $P_c$ which is fed to a chamber 205 surrounding bellows 203 via a passage 206. The load applied to lever 200 through roller 199 is opposed by a constant reference force derived from a spring 207 interposed between a plate 208 and a spring retainer 209, the latter being supported by discs 210 which, in turn, are supported by a fixed support member 211 threadedly secured to casing 77. The discs 210 provide for temperature compensation of the fuel surrounding spring 207. The force of spring 207 is transmitted to lever 200 through roller 199' which rolls between plate 208 and the adjacent arm of lever 200 and which is rotatably carried on a yoke 212 pivotally secured to end portion 86 of metering valve 84.

A compressor pressure limiting device generally indicated by numeral 213 serves to limit the compressor discharge pressure $P_c$ to a predetermined maximum value. The pressure limiting device 213 includes a bellows 214 vented interiorly to passage 206 upstream from a restriction 215 via a restriction 216 and exposed exteriorly to atmospheric air pressure $P_a$ in a chamber 217. The bellows 214 is loaded in compression by a spring 218 which bears against a spring retainer 219 fixedly secured to the closed end of bellows 214. A lever 220 pivotally secured at one end to casing 77 is pivotally secured to spring retainer 219 such that expansion or contraction of bellows 214 results in pivotal movement of lever 220 about its one end. The opposite end of lever 220 is adapted to engage the discharge end of a passage 221 leading from passage 206 downstream from restriction 215 to chamber 217 at atmospheric air pressure $P_a$.

Fuel at regulated servo pressure $P_r$ is delivered to the afterburner fuel control 55 at a predetermined high pressure air compressor speed $N_2$ via a passage 226 connected to passage 181, a slide valve 227, and a passage 228. The slide valve 227 is biased to a closed position by a spring 229 as shown in FIGURE 2, such that flow from passage 226 to passage 228 is blocked and passage 228 is vented to the interior of casing 77 at drain pressure $P_o$. A lever 230 pivotally secured to an adjustable fixed rod 231 threadedly engaged with casing 77 and pivotally secured to slide valve 227 is adapted to be engaged by an arm 232 fixedly secured to piston 105. At a predetermined position of piston 105 which corresponds to a predetermined high pressure air compressor speed $N_2$, the lever 230 is actuated by arm 232 causing slide valve 227 to move upward against spring 229 thereby communicating passage 226 with passage 228 to permit fuel at regulated servo pressure $P_r$ to flow to the afterburner fuel control 55.

The speed request cam 132 is actuated axially on shaft 133 as a function of compressor inelt air temperature $T_1$ and pressure $P_1$ by either of two cams 233 or 234 which are contoured radially as a function of compressor inlet air temperature $T_1$ and axially as a function of compressor inlet air pressure $P_1$. The cams 233 and 234 are fixedly secured together and are slidably carried on a shaft 235 having a pinion 236 fixedly secured thereto which meshes with rack 176. The cams 233 and 234 rotate with shaft 235 and are translated on shaft 235 by a follower 237 pivotally secured to casing 77 and provided with an end portion which extends into an annular recess 238 separating cams 233 and 234. The opposite end portion of follower 237 extends into an annular recess 239 formed in a piston member 240 slidably carried in a chamber 241. Fuel at regulated servo pressure $P_r$ is conducted via a passage 242 from passage 181 to chamber 241 at one side of piston 240 from which the fuel flows through a restriction 243 fixedly secured to piston 240 to chamber 241 at the opposite side of piston 240 from which the fuel flows to the interior of casing 77 at drain pressure $P_o$ via a passage 244 having a variable area valve 245 at the discharge end thereof. The effective flow area of valve 245 and thus the pressure drop across piston 240 is controlled by a lever 246 pivotally secured to casing 77 and provided with an end portion which extends into a chamber 247 and which is pivotally secured to the movable end of a sealed bellows 248. A fixed end of the bellows 248 is adjustably anchored to casing 77 by screw member 249 threadedly engaged with casing 77. The bellows 248 expands or contracts in response to a decrease or increase, respectively, of compressor inlet air pressure $P_1$ which is supplied to chamber 247 via a passage 250. The force applied to lever 246 by bellows 248 is opposed by a constant reference force derived from a spring 251 and transmitted to lever 246 through a roller 252 which rides between a plate 253 against which spring 251 bears and an arm 254 integral with lever 246. The roller 438 is rotatably carried by a yoke 255 which is pivotally secured to piston 240. A spring retainer 256 supported by temperature responsive discs 257 serves to retain the one end of spring 251.

The cam 132 is actuated axially by a lever 258 having an end portion which extends into an annular recess 259 formed at one end of cam 132. The lever 258 is integral with a casing 260 having a chamber 261 in which a piston 262 is slidable. The casing 260 is pivotally supported on casing 77 by a cylindrical extension 263 integral with casing 260 and pivotally secured in a bore 264 in casing 77 and is provided with integral parallel arms 265 and 266. Arm 265 is loaded by a spring 266' which urges casing 260 counterclockwise. Lever 268 is pivotally secured to arm 266 and the lever and arm are provided with cam followers 269 and 270, respectively, secured thereto which are adapted to engage cams 233 and 234, respectively. As shown in FIGURE 2, the cam follower 270 is held away from cam 234 when cam follower 269 is engaged with cam 233. However, under certain conditions of operation the cam follower 269 is held away from cam 233 and cam follower 270 is permitted to engage cam 234. In either event, it will be understood that only one of the cams 233 and 234 is effective at any given time depending upon which of the followers 269 and 270 is engaged with its respective cam surface. To this end, the lever 268 is attached at one end to one end of a tension spring 271 which is attached at the opposite end to arm 265. A roller 272 rotatably carried by a yoke 273 is engageable with opposing surfaces of arm 265 and lever 268. The yoke 273 is pivotally secured to piston 262. A spring 274 interposed between piston 262 and casing 260 opposes regulated servo pressure $P_r$ which is transmitted to chamber 261 via a passage 275 leading to the bore 264, a central passage 276 in extension 263 and a passage 277 in casing 260. A restricted passage 260' communicates passage 275 with the interior of casing 77 at drain pressure $P_o$.

The spring loaded valve 82 is vented on its back side to fuel at drain pressure $P_o$ or fuel at pump discharge pressure $P_1$ via a passage 278, a spring loaded slide valve 279 and a passage 280. The slide valve 279 is pressure balanced and biased to the position shown in FIGURE 3 by the spring bearing thereagainst whereby passage 278 is vented to drain fuel pressure $P_o$. A lever 281 fixedly secured to shaft 133 engages slide valve 279 at a fuel cut-off position of throttle lever 54 and actuates valve 279 to thereby establish communication between passages 278 and 280 and permit fuel at pressure $P_1$ to flow to the back side of valve 279. The spring force acting against valve 82 assisted by fuel pressure $P_1$ overcomes the fuel pressure $P_2$ acting against the opposite side of valve 82 thereby actuating valve 82 to a closed position which results in shutting off the fuel flow to conduit 44.

The fuel pressure drop $P_1-P_2$ across metering valve 84 is maintained at a predetermined value by a by-pass valve 282 which controls the effective flow area of a fuel by-pass conduit 283 leading from passage 78 to the drain passage 53. A piston 284 integral with by-pass valve 282 is slidable within a chamber 285 and is exposed on one side to fuel pressure $P_2$ which is supplied to chamber 285 via a passage 286 having a restriction 287 therein. The opposite side of piston 284 is exposed to servo fuel pressure $P_s$ derived from fuel pressure $P_1$ and supplied to chamber 285 via a passage 288, a chamber 289, and a passage 290. The servo fuel pressure $P_s$ is controlled by a valve 291 connected to the inlet end of passage 290 and arranged to vary the effective flow area thereof in response to movement of a lever 292 pivotally connected to casing 77. Lever 292 is pivotally connected to and actuated by the closed end of a bellows 293 which is exposed on one side to fuel pressure $P_1$ in chamber 289 and on the opposite side to fuel pressure $P_2$ in a chamber 294 which communicates with chamber 285 via a passage 295. A predetermined spring load is imposed on bellows 293 by a spring 296 supported by temperature responsive discs 297 and adjustable retainer 298 threadedly secured to casing 77. A spring 299 interposed between casing 77 and piston 284 loads the by-pass valve 282 in a closing direction. A spring 300 interposed between piston 284 and a piston 301 slidably carried by valve 282 loads the piston 284 in opposition to spring 299. The load derived from spring 300 varies depending upon the position of piston 301 which responds to the fuel pressure differential $P_1-P_2$ thereacross. A restricted passage 302 communicates passage 290 with passage 78 at fuel pressure $P_2$. It will be noted the piston 301 coacts with the valve 282 such that the effective flow area of valve 282 depends upon the position of piston 301 as well as the position of valve 282. For further details of structure and operation of the by-pass valve 282, reference is made to copending application Serial No. 782,948, filed December 24, 1958, in the name of F. R. Rogers et al. (common assignee).

An emergency fuel schedule is supplied to conduit 44 in the event of a malfunction of the above described structure of the main fuel control 43. To this end, a spring loaded fuel transfer valve 303 slidably carried in casing 77 is arranged to divert fuel from passage 78 upstream from filter 79 to a conduit 304 leading to passage 44 and provided with a variable area valve 305 which controls the effective flow area thereof. The valve 305 is pivotally connected to a lever 306 which, in turn, is fixedly secured to and rotated by a gear 307 which meshes with gear 134 and is positioned as a function of throttle lever 54 position. The fuel pressure differential across valve 305 is regulated by a double ported by-pass valve 308 which controls fuel flow through a fuel by-pass conduit 309 leading from conduit 304 to the conduit 283 at drain pressure $P_o$. A diaphragm 310 fixedly secured to valve 308 and loaded by a spring 311 supported by adjustable retainer 312 threadedly engaged with casing 77 is responsive to fuel pressure $P_1$ upstream from valve 305 and a servo fuel pressure $P_s$ derived from fuel pressure $P_1$ and regulated by a valve 313 upstream from a fixed area restriction 314. The valve 313 and restriction 314 are arranged in series in a conduit 315 leading from conduit 309 to conduit 304. The fuel pressure $P_s$ intermediate valve 313 and restriction 314 varies as a function of the area ratio of valve 313 and restriction 314 which area ratio depends upon the position of valve 313. The valve 313 is slidably carried in casing 77 and is actuated by one end of a lever 316 pivotally secured to casing 77. The opposite end of lever 316 is pivotally connected to the movable end of a sealed bellows 317 which is anchored at its opposite end to casing 77 by an adjustable retaining member 318 threadedly engaged with casing 77. Compressor inlet air pressure $P_i$ is supplied via a passage 319 leading from passage 49 to a chamber 320 surrounding bellows 317 which expands and contracts in response to a decrease and increase, respectively, in pressure $P_i$. The transfer valve 303 is held in the position shown in FIGURE 2 by a spring 321 which is assisted by fuel pressure $P_1$ in a chamber 322 containing spring 321. The chamber 322 receives fuel from conduit 78 via a restricted passage 323 in one end of valve 303 and is vented to by-pass conduit 309 at drain pressure $P_o$ via a passage 324 containing a normally closed valve 325 which is actuated by an electrical solenoid 326. The opposite end of valve 303 is exposed to fuel pressure $P_1$ in a chamber 18 which communicates with conduit 78 via a passage 19 formed in valve 303. The solenoid 326 is energized by switching means which may be manually actuated or automatically actuated in response to a malfunction of the main control system heretofore described. Energization of the solenoid 326 causes valve 325 to open whereupon the fuel pressure in chamber 322 decreases to drain pressure $P_o$ by virtue of the pressure drop across restricted passage 323 which allows fuel pressure $P_1$ acting against the one end of valve 303 to overcome spring 321 thereby displacing valve 303 to the right to cut off flow through conduit 78 and simultaneously divert flow from conduit 78 to conduit 304. A spring loaded check valve 327 in conduit 304 is held closed by fuel pressure $P_2$ downstream therefrom during normal operation. Under emergency operation the check valve 327 is open and the check valve 83 in conduit 78 is held closed by the fuel pressure downstream therefrom.

Referring to FIGURES 4, 4a and 5, numerals 328 and 329 designate casings of the afterburner fuel control 55 and exhaust nozzle control 70, respectively. A passage 330 vents the interior of casing 328 to the interior of casing 329 which, in turn, is vented to conduit 53 at drain pressure $P_o$ via passage 63.

Referring to FIGURES 4 and 4a, the centrifugal pump 60 is arranged to discharge into a conduit 331 which contains a check valve 332 and a pressure regulating valve 333 and which leads to the inlet of a metering valve 334 from which fuel flows through a throttling valve 335 to a conduit 336 leading to conduit 56 which, in turn, supplies fuel to afterburner manifold 38. A pressure regulated valve 337 and fuel cut-off valve 338 are arranged in series flow relationship in conduit 336. The remaining two afterburner manifolds 39 and 40 are supplied fuel via separate conduits 339 and 340, respectively, leading from conduit 331 to valve structure, not shown, identical to metering valve 334, throttling valve 335, pressure regulating valve 337 and cut-off valve 338 and designated by boxes 341 and 342, respectively, which communicate with outlet conduits 57 and 58 leading to afterburner manifolds 39 and 40, respectively.

A pressure actuated valve 345 in conduit 59 leading to the inlet of pump 60 is actuated to an open position by regulated fuel pressure $P_r$ which is supplied thereto via a passage 346 leading from the main fuel control 43 to the exhaust nozzle control 70, a passage 347 in casing 329, a passage 348 connecting passage 347 with casing 328, a passage 348 leading to the inlet of a valve 349 from which the fuel at regulated pressure $P_r$ flows via passage 350 to valve 345. The valve 349 is provided with an integral piston 351 having an annular area at one end exposed to passage 348 at regulated pressure $P_r$ and an opposite end exposed to fuel pressure in a chamber 352. The chamber 352 is vented to regulated fuel pressure $P_r$ via a passage 353 leading from passage 348 and to drain fuel pressure $P_o$ via a passage 354 leading to the interior of casing 328 at pressure $P_o$. As shown in FIGURE 4, the piston 351 is biased against a stop 355 integral with casing 328 by regulated pressure $P_r$ in opposition to the force of a spring 356 interposed between stop 355 and piston 351. A flapper valve 357 engageable with orifices 358 and 359 in series flow with passages 353 and 354, respectively, is attached to one end of a lever 360 which is pivotally secured to casing 328 and which is pivotally secured at its opposite end to a stem 361 fixedly secured to a diaphragm 362. The diaphragm 362 is loaded by a spring 363 and is vented on one side to conduit 331 upstream of check valve 333 via passage 364 and on the opposite side to conduit 331 downstream of check valve 333 via a passage 365. A passage 365' containing a restriction 366 is connected between passages 364 and 365. A spring 367 interposed between piston 351 and lever 360 serves to preload lever 360. Movement of piston 351 results in a corresponding change in spring 367 load against lever 360 thereby causing flapper valve 357 to move to a fully open or closed position depending upon the direction of movement of piston 351.

The centrifugal pump 60 is a relatively high capacity pump and does not therefore function efficiently at relatively low flow rates. The initial low fuel flow rate for afterburner operation is supplied by the engine driven positive displacement type pump 76' which also supplies pressurized fuel to the exhaust nozzle control 70 (FIGURE 5). To this end, fuel is supplied to conduit 331 from the pump 76' via a conduit 368 containing a filter 369 and a spring loaded pressure regulating valve 370 (FIGURE 5), a passage 371 leading to the inlet of a valve 372 from which fuel flows through a passage 373 to conduit 331 upstream from check valve 333. The pressure regulating valve 370 functions to reduce the relatively high pressure fuel which may be on the order 3,000 p.s.i. discharged by pump 76' to a lower pressure such as 1,000 p.s.i. which is supplied to conduit 371. The valve 372 has smaller area portion 374 exposed to the fuel pressure in passage 371, and is provided with a piston portion having an annular portion 375 which is exposed to drain fuel pressure $P_o$ via a passage 376, and a larger area portion 377 exposed to the fuel pressure in conduit 331 upstream from check valve 332 via a passage 378.

The variable area metering valve 334 in flow controlling relationship with conduits 331 and 336 is provided with a piston portion 379 which is slidably carried by casing 328 and which separates variable volume chambers 380 and 381. Filtered fuel is supplied to chamber 380 from conduit 331 via a passage 382 containing a filter 383. A branch passage 384 containing a restriction 385 communicates passage 382 with chamber 381. The metering valve 334 is positioned in accordance with the servo pressure $P_x$ in chamber 381 which is controlled by a servo valve 386 which coacts with the inlet end of an axial passage 387 formed in valve 334 to vary the flow out of chamber 381. A spring 388 interposed between piston portion 379 and casing 328 and a spring 389 interposed between servo valve 386 and piston portion 379 provide oppositely acting preloads on valve 334. The servo valve 334 is positioned toward or away from passage 387 by a lever 390 pivotally secured at one end to an extension 391 of valve 334 which extension is slidably carried by casing 328. An adjustable stop 392 threadedly engaged with lever 390 is adapted to engage casing 328, thereby limiting movement of lever 390. The lever 390 is fixedly secured to a shaft 393 which is journalled in casing 328 and which slidably carries a follower 394 having a flange 395 formed thereon. A rod 396 fixedly secured to lever 390 is slidably carried in a slot 397 in flange 395 to thereby permit follower 394 to move axially relative to lever 390 but prevent relative rotational movement therebetween. The follower 394 is provided with an adjustable arm 398 threadedly engaged therewith and adapted to engage a cam or ramp member 399 pivotally secured to casing 328 by means of a shaft 400. A follower 401 threadedly engaged with cam member 399 rides against a three dimensional cam 402 fixedly secured to a shaft 403 suitably supported by casing 328 for rotational and axial movement. The shaft 403 is translated by a lever 404 pivotally secured to casing 328 and extending into engagement with a retaining annulus 405 formed on shaft 403. The opposite end portion of lever 404 is pivotally secured to a servo piston 406 which responds to a variable servo fuel pressure differential $P_s-P_r$ thereacross. The fuel pressure $P_s-P_r$ is controlled by a servo valve 407 which regulates the fuel pressure $P_s$ and which is connected to one end of a lever 408 pivotally secured to casing 328. The lever 408 is actuated by a bellows 409 having one end anchored to casing 328 and an opposite closed end which bears against one end of lever 408. A spring 410 urges lever 408 into engagement with the closed end of bellows 409. A tube 411 filled with a temperature responsive liquid is connected at one end to temperature probe 61 and at an opposite end to the interior of bellows 409 which, like tube 411, is filled with temperature responsive liquid. The bellows 409 expands or contracts by virtue of the volume expansion or contraction of the temperature responsive liquid in response to temperature variations at probe 61. The shaft 403 is rotated by a rack 412 (see FIGURE 5) which engages a pinion 413 fixedly secured to shaft 403 and which forms part of the control mechanism of the exhaust nozzle control 70 to be described. It will be understood that the shaft 403 is translated as a function of compressor inlet temperature $T_1$ and rotated by rack 412 as a function of exhaust nozzle area, pressure ratio $P_{T4}/P_{T7}$ across turbines 33 and 30 and the position of throttle lever 54.

The follower 394 is translated on shaft 393 by a lever 414 pivotally secured to casing 328 and engageable at one end with a flange 395' integral with follower 394. A spring 415 interposed between lever 390 and follower 394 serves to bias flange 395' into engagement with the adjacent end of lever 414. The remaining two followers 394 connected to valve structure 341 and 342, respectively, likewise are provided with similar structure as shown in FIGURE 4a where the followers 394 simultaneously respond axially to movement of lever 414 and rotate independently of each other to position the respective control levers 390 to a variable degree depending upon the contour of the respective cams 402, 451 and 452. The opposite end of lever 414 extends into engagement with a retaining annulus 416 formed in an extension of a servo piston 417 slidably carried in casing 328 and responsive to a fuel servo pressure differential $P_s-P_r$ thereacross. The pressure differential $P_s-P_r$ is controlled by a servo valve 418 which regulates fuel pressure $P_s$ in response to movement of a lever 419 pivotally secured to casing 328. The lever 419 is actuated by a bellows 420 which is anchored at one end to casing 328 and vented interiorly to compressor discharge pressure $P_c$ via passage 62. An evacuated bellows 421 is fixedly secured at one end to casing 328 and at its opposite end is fixedly secured to bellows 420 which, in effect, renders the output force of bellows 420 a function of compressor discharge pressure $P_c$ absolute. A feedback torque is applied through lever 419 in opposition to the torque derived from bellows 420 through a roller 422 which rides between lever 419 and a plate 423 loaded by a constant reference force derived from a spring 424. One end of spring 424 is supported by temperature responsive discs 425 and adjustable retaining member 426 threadedly engaged with casing 328. The roller 422 is rotatably secured to a yoke 427 pivotally secured to servo piston 417 and is positioned simultaneously with movement of servo piston 417 to vary the effective lever arm of lever 419 through which the constant reference force spring 424 acts to thereby balance the opposing torque derived from bellows 420. The temperature responsive discs provide temperature compensation with regard to the fuel surrounding spring 424.

The fuel pressure differential $P_1-P_2$ across metering valve 334 is controlled at a predetermined constant value by throttling valve 335 in series with and downstream from metering valve 334. A piston 429 integral to valve 335 is provided with a relatively large face 430 against which a servo fuel pressure $P_x$ acts, an intermediate face 431 to which fuel at pressure $P_1$ is supplied via a passage 432 leading from passage 382, and a relatively small face 433 which further includes annular end portion 434 against which fuel at pressure $P_2$ acts. The servo fuel pressure $P_x$ is generated between a restricted inlet passage 435 leading from passage 382 and a discharge passage 436 having a variable area valve 437 arranged in the discharge end thereof. The flow out of passage 436 and thus pressure $P_x$ is controlled by valve 437 which is connected to the movable end of a bellows 438 exposed on one side to fuel pressure $P_1$ via a passage 439 leading from the upstream side of metering valve 334 and exposed on the opposite side to fuel pressure $P_2$ via a passage 440 leading from the downstream side of metering valve 334. The fuel pressure differential $P_1-P_2$ acting across bellows 438 is opposed by a spring 441 interposed between an adjustable spring retainer 442 threadedly secured to casing 328 and a spring retaining member 443 fixedly secured to the movable end of bellows 438. The bellows 438 is anchored at its open end to casing 328 by any suitable means providing a fluid seal.

The cut-off valve 338 is responsive to metered fuel pressure $P_3$ is conduit 336 and to a spring 444 and fuel pressure in a chamber 445 which receives fuel from conduit 336 via a passage 446 in parallel with check valve 337 and restricted passages 447 and 448. A discharge passage 449 conducts fuel out of chamber 445 and the flow therethrough is controlled by a valve in the exhaust nozzle control 70 to be described. A filter 450 disposed in passage 446 serves to filter the fuel received by passages 447 and 448.

As pointed out heretofore, the afterburner fuel control 55 controls the flow of fuel to three afterburner fuel manifolds 38, 39 and 40. The above described metering valve 334, throttling valve 335, cut-off valve 338, pressure regulating valve 337 are duplicated for each of the other two manifolds 39 and 40 and designated by boxes 341 and 342, respectively. The operation of the metering valve 334 in the boxes 341 and 342 is controlled by cams 451 and 452, respectively, which, like cam 402, are carried by shaft 403 and rotated and translated as a function of compressor inlet temperature $T_1$ and exhaust nozzle area, pressure ratio $P_{T4}/P_{T7}$ across turbines 33 and 30, and throttle lever 54 position, respectively. As in the case of cam 402, cams 451 and 452 each actuate a follower 401 connected to a cam member 399 pivotally secured to casing 328. The cam member 399 in each case actuates a follower 394 which, in turn, rotates a lever 390 fixedly secured to an associated shaft mounted for rotation in casing 328 which lever 390 is connected to control the operation of its associated metering valve 334.

Now, referring to FIGURES 5 and 6, which together illustrate the exhaust nozzle control 70 in more detail, the conduit 368 is connected to a passage 453 leading to the inlet of a spool valve 454 which is shown in a null position whereby lands 455 and 456 thereof block passages 457 and 458, respectively, which lead to passages 66 and 68 communicating with piston 65. Movement of spool valve 454 in one direction from the null position shown serves to simultaneously communicate passage 457 with passage 453 and communicate passage 458 with drain fuel pressure $P_o$ via drain passage 459 leading to fuel conduit 76, whereas movement in the opposite direction communicates passage 458 with passage 453 and communicates passage 457 with drain fuel pressure $P_o$ via drain passage 460 leading to drain passage 459. A servo piston 461 integral with spool valve 454 is provided with an extended portion having a passage 462 therein which is in series with a passage 463 leading from one side of servo piston 461. The opposite side of servo piston 461 communicates with regulated fuel pressure in passage 371 via a passage 464. A spring loaded check valve 465 communicates passage 371 with drain passage 459 and opens when the pressure of the fuel in passage 371 exceeds a predetermined value. A restricted passage 466 permits fuel to flow from passage 464 to passage 463. A solenoid operated valve 467 disposed in passage 463 is biased to a closed position in response to energization of the solenoid 467′ attached thereto to thereby prevent flow through passage 463. With valve 467 in an open position the fuel pressure on one side of piston 461 is controlled by a valve member 470 which coacts with the discharge end of passage 462 to vary the effective flow area thereof. The valve 470 is attached to one end of a lever 471 which, in turn, is pivotally secured to one end of a rod 472 and actuated by a follower 473 fixedly secured thereto. The follower 473 rides against a first contoured portion of a three dimensional nozzle area and fuel flow correlation cam 474 fixedly secured to a shaft 475 mounted on casing 329 for rotational and axial movement relative thereto. The shaft 475 is rotated as a function of exhaust nozzle area by pulley 74 through gears generally indicated by 476. The shaft 475 is translated as a function of the pressure ratio $P_{T4}/P_{T7}$ across turbines 33 and 30 by a lever 477 pivotally connected at one end to shaft 475 and pivotally connected to an extension 478 integral with a servo piston 479. Fuel at regulated servo pressure $P_r$ is supplied to one side of piston 479 at a predetermined high pressure compressor speed $N_2$ from main fuel control 43 via a passage 480, a spring loaded spool valve 481 actuated by a first contoured portion of a cam 482, a passage 483, a two-position spool valve 484, and passage 228. The piston 479 is provided with a restriction 486 which communicates the one side of piston 479 with the opposite side thereof from which opposite side the fuel escapes to the interior of casing 329 at drain pressure $P_o$ via discharge passage 487. The pressure drop across the piston 479 is controlled by a servo valve 488 secured to one end of a lever 489 pivotally secured to a stem 490 which is fixedly secured at one end to the movable end of an evacuated bellows 491 and which is fixedly secured at the opposite end to the movable closed end of a bellows 492. The evacuated bellows 491 is anchored at one end to casing 329. The bellows 492 is anchored at one end to casing 329 and is vented interiorly to pressure $P_{T4}$ upstream of turbine 33 via passage 72. The lever 489 is pivotally secured to casing 329 at 494. A roller 495 rides against lever 489 and across an arm integral with a lever 496 which is pivotally secured to casing 329 and a stem 497. The stem 497 is fixedly secured at one end to the movable end of an evacuated bellows 498 and at its opposite end to the movable closed end of a bellows 499. The evacuated bellows 498 is anchored at one end to casing 329. The bellows 499 is anchored at one end to casing 329 and is vented interiorly to pressure $P_{T7}$ downstream of turbines 30 via passage 73. The roller 495 is rotatably carried by a yoke 501 pivotally secured to a spring loaded follower 502 which is slidably carried by casing 329 and which is biased into engagement with the first contoured surface of the three dimensional cam 482. The cam 482 is mounted on a shaft 503 which rotates the cam 482 and which is provided with an integral pinion 504. A rack 505 fixedly secured to a servo piston 506 drives the pinion 504 in response to movement of piston 506. The cam 482 is slidably mounted for axial movement on shaft 503 and is translated by a yoke 507 fixedly secured to extension 478 and suitably secured to an annulus on the cam 482 to permit rotational movement thereof. Fuel at regulated pressure $P_r$ is conducted to one side of piston 506 via a passage 508 leading from passage 483. Fuel is transmitted through a restriction 509 in piston 506 to the opposite side of piston 506 from which fuel flows through a passage 510 to the main fuel control 43 (FIGURE 2). Referring to FIGURE 2, the passage 510 discharges into a chamber 511 which is vented to the interior of casing 77 at drain pressure $P_o$ via a passage 512. A valve 513 connected to the discharge end of passage 510 serves to control the effective flow area thereof and thus servo pressure $P_x$ on the one side of piston 506. A lever 514 pivotally secured to casing 77 is actuated by the movable end of a bellows 515 having a fixed end anchored to casing 77. A restriction 516 fixedly secured to the movable end of bellows 515 permits fuel to flow out of bellows 515 to chamber 511 at drain pressure $P_o$. A roller 517 rides between lever 514 and a plate 518 which is loaded by a constant reference force derived from a spring 519 having a fixed end supported by an adjustable retainer 520 threadedly engaged with casing 77. The roller 517 is rotatably connected to a yoke 521 which is pivotally secured to a follower 522 slidably carried by casing 77 and engageable with cam portion 101. The interior of bellows 515 is vented to the interior of a bellows 523 in exhaust nozzle control 70 (FIGURE 6) via a passage 524. Referring to FIGURE 6, restricted passage 525 communicates fuel at regulated pressure $P_r$ to passage 524 from passage 483. The fuel flow out of passage 524 and thus fuel pressure $P_s$ within bellows 515 is controlled by a servo valve 526 fixedly secured to the movable end of bellows 523 which coacts with the inlet end of a tubular member 527 fixedly secured to a fixed end of bellows 523 and communicating the interior of bellows 523 with the interior of casing 329 at drain fuel pressure $P_o$. The movable end of bellows 523 is fixedly secured to a lever mechanism 528 which is loaded by a constant reference force derived from a spring 529 acting through a roller 530 which rides between lever 528 pivotally secured to casing 329 and a plate 531 against which spring 529 bears. The opposite end of spring 529 is supported by an adjustable retainer 532 threadedly engaged with casing 329. The roller 530 is rotatably carried by a yoke 533 pivotally secured to rack 505. A lever 528′ pivotally secured to casing 329 and spaced from lever 528 is adapted to engage an end portion of lever 528 as will be described hereinafter. Levers 528 and 528′ are preloaded by springs 534 and 535, respectively, which are supported at one end by adjustable retainers 536 and 537, respectively, threadedly engaged with casing 329. A bellows 538 provided with a movable closed end is engageable with lever 528′ and is anchored at its opposite end to casing 329 and is vented interiorly to passage 483 at regulated pressure $P_r$ via a restricted passage 539 and to the interior of casing 329 at drain pressure $P_o$ via a passage 540 leading from passage 539 upstream of the restriction therein to a passage 541 formed in a lever member 542 and provided with a servo valve 543 at the discharge end thereof. The lever member 542 is pivotally mounted to casing 329 at 544. A rotatable cam 545 fixedly secured to a shaft 546 which is rotated by throttle lever 54 engages servo valve 543 and holds the same closed until a predetermined throttle lever position is attained at which time the servo valve 543 is allowed to open thereby venting passage 541 to drain pressure $P_o$. A lever 547 pivotally secured at one end to lever member 542 and pivotally secured at its opposite end to a ratchet member 548 is biased into engagement with a stop member 549 on lever 542 by a spring 550 interposed between lever 547 and a retainer 551 fixedly secured to lever 542. A spring 552 interposed between casing 329 and lever 547 urges lever 542 toward cam 545. The ratchet member 548 is provided with a stop 553 inetgral thereto which is urged into engagement with lever 547 by the force of a spring 554 interposed between lever 547 and ratchet member 548. A servo valve 555 fixedly secured to lever 547 coacts with the discharge end of a passage 556 formed in an extended portion of a servo piston 557 which is vented on one side to regulated fuel pressure $P_r$ via a passage 558 leading from passage 346 and on the opposite side to fuel at regulated pressure $P_r$ via a restricted passage 559, a passage 560 leading to the outlet side of a spool valve 561, and a passage 562 leading from the inlet side of valve 560 to passage 483. A valve member 563 inetgral to servo piston 557 is provided with a passage 564 which serves to connect a passage 565 leading from passage 560 at regulated pressure $P_r$ with a passage 566 leading to passage 275 in the main fuel control 43 (FIGURE 2) which, in turn, leads to chamber 261 at one side of piston 262. A second passage 567 in valve member 563 serves to connect a passage 568 leading from passage 565 at regulated pressure $P_r$ with one of three spaced apart passages 569, 570 or 571 depending upon the position of the valve 563. The passages 569, 570 and 571 merge into a passage 572 leading to one side of a two position piston 573 where it acts in opposition to a spring 574 bearing against piston 573. A branch restricted passage 575 communicates passage 572 with the opposite side of piston 573 from which fuel is permitted to escape to the interior of casing 329 at drain pressure $P_o$ via a passage 576 formed in piston 573 and a servo valve 577 engageable with the discharge end of passage 576. The servo valve 577 is fixedly secured to one end of a lever 578 pivotally secured to casing 329 and provided with an adjustable screw member 579 threadedly engaged therewith which is engaged by a bracket 580 fixedly secured to extension 478. A spring 581 loads lever 578 in a counterclockwise direction. The piston 573 is provided with an integral valve portion 582 which in one position communicates a passage 583 leading from passage 480 at regulated pressure $P_r$ with a passage 584 leading to one side of a spring loaded piston 585 which is exposed on its opposite side to drain fuel pressure $P_o$ and in a second position, as shown in FIGURE 5, disestablishes said communication and vents passage 584 to drain pressure $P_o$. A stem 586 extending from piston 585 is engageable with one end of a spring biased lever 587 pivotally secured to casing 329 which lever is provided with an opposite end portion 588 engageable with upper flats of ratchets 589, 590 and 591 formed on ratchet member 548. A spring biased lever 592 pivotally secured to casing 329 is provided with an end portion 593 engageable with lower flats of ratchets 589, 590 and 591 and is adapted to be engaged by a stem 594 integral with a spring biased piston 595 having a restriction 596 which provides for drainage or fuel from one side of piston 595 to the opposite side thereof. Fuel at regulated pressure $P_r$ is supplied to one side of piston 595 via a passage 597, and a passage 598 leading from passage 347. A valve 599 in flow controlling relationship with passage 597 is pivotally secured to a lever 600 which is pivotally secured to casing 329 and actuated by raised portions 601, 602 and 603 formed on an extension of rack 412. The rack 412 is actuaed by servo piston 604 one side of which is exposed to regulated pressure $P_r$ via passage 605 leading from passage 598. The opposite side of servo piston 604 communicates with regulated pressure $P_r$ via a restricted passage 606 leading from passage 568 and with the interior of casing 329 at drain pressure $P_o$ via a discharge passage 607 formed in an extension 608 integral with piston 604. The flow through passage 607 and thus the fuel pressure acting upon piston 604 is controlled by a servo valve 609 which coacts with the discharge end of passage 607 to vary the effective flow area thereof. The servo valve 609 is fixedly secured to and actuated by a follower 610 which rides against a second contoured portion of cam 474. A lever 611 pivotally secured to follower 610 at 612 is resiliently held in position relative to follower 610 by a spring 613 interposed between follower 610 and a spring retainer 614 integral with lever 611. A pair of adjustable stop members 616 and 617 threadedly engaged with a lever 615 are adapted to engage lever 611 as will be described. The lever 615 extends into engagement with a retaining annulus 618 formed on rod 472 which is actuated by a lever 619 pivotally secured at one end to casing 329 and at the opposite end engageable with the end of valve 563. A spring 620 serves to bias the end of rod 472 into engagement with lever 619.

An arm 621 fixedly secured to valve 563 is connected to a spool valve 622 which is provided with lands 623 and 624. Depending upon the position of valve 622, land 623 serves to vent passage 449 leading to manifold cut-off valve 338 to drain pressure $P_o$ as well as passages 625 and 626 leading to valves 338 in boxes 341 and 342, respectively. Also, depending upon the position of valve 622, the passage 449 may be vented to a passage 627 leading from passage 382 which passage 627 contains a flow regulating valve 628. A diaphragm 629 fixedly secured to valve 628 responds to the pressure drop across valve 628 which acts in opposition to a spring 630 acting against diaphragm 629 to thereby control the position of valve 628 to maintain the pressure drop thereacross at a constant value. With the valve 622 positioned as shown in FIGURE 5, the shut-off valve 338 is held closed by virtue of the passage 626 being vented to passage 627 which permits a continuous flow of pressurized fuel through passage 626 to the valve 338. The continuous flow of fuel to valve 338 also provides for cooling of the same when closed since the valve 338 may be positioned near the engine in an environment of relatively high temperature.

The spool valve 481, FIGURE 6, is provided with a stem 631 which engages a second contoured surface of cam 482. The valve 481 is actuated in one direction from a null position shown to vent fuel at regulated pressure $P_r$ to a passage 632 leading to one side of a servo piston 633 and simultaneously vent a passage 634 leading from the opposite side of piston 633 to the interior of casing 329 at drain pressure $P_o$. Actuation of valve 481 in the opposite direction from the null position vents passage 634 to regulated pressure $P_r$ and passage 632 to drain pressure $P_o$. The servo piston 633 is pivotally secured to one end of lever 477 which is pivoted about its connection with extension 478 in response to movement of piston 633.

A fuel pressure signal indicative of afterburner blowout is supplied to the main fuel control 43 from exhaust nozzle control 70 via a passage 635 leading to passage 148 downstream of solenoid actuated valve 150 (FIGURE 2). As shown in FIGURES 5 and 6, the passage 635 is vented to fuel at regulated pressure $P_r$ via a passage 636, a chamber 637 containing a double ended valve 638, a passage 639, a spool valve 640 and a passage 641 leading to passage 483 at regulated pressure $P_r$. The valve 638 is shown in a normally closed position whereby the smaller end thereof cooperates with the discharge end of passage 639 to block flow therethrough. The opposite large end of valve 638 is biased away from an orifice 642 which vents chamber 637 and passage 636 connected thereto to the interior of casing 329 at drain fuel pressure $P_o$. The valve 638 is held in the normally closed position by a lever 643 pivotally secured thereto and pivotally secured to casing 329. The opposite end of lever 643 is engaged by a spring biased retaining member 644 slidably carried by casing 329 which retaining member urges lever 643 clockwise thereby closing valve 638. Bracket 580 on extension 478 is provided with an adjustable screw member 645 threadedly engaged therewith which in response to movement of extension 478 engages retaining member 644 urging the same toward casing 329 thereby unloading lever 643 and permitting valve 638 to open in response to the fuel at pressure $P_r$ acting against the smaller end thereof which fuel at pressure $P_r$ flows into chamber 637 and acts against the larger end of valve 638 thereby holding valve 638 open. It will be understood that the larger end of valve 638 is seated by the pressure $P_r$ in chamber 637 thereby sealing the vent to drain pressure $P_o$.

A passage 646 containing a check valve 647 communicates passage 636 with one side of a land portion 648 of spool valve 561. The check valve 647 remains closed until actuated by regulated pressure $P_r$ in passage 636 at which time fuel at pressure $P_r$ is permitted to flow through check valve 647 to the one side of land portion 648 whereupon valve 561 is actuated to the right as viewed in FIGURE 6 causing land portion 648 to block communication between passages 562 and 560. In the above mentioned rightward position a second land portion 649 of spool valve 561 vents passage 560 to a passage 650 leading to the interior of casing 329 at drain pressure $P_o$. As valve 561 moves rightward, a tapered end portion 651 on valve 561 moves out of engagement with the discharge end of a passage 652 thereby admitting a second source of fuel at regulated pressure $P_r$ to land portion 648. The passage 652 communicates with passage 346 at regulated pressure $P_r$ via an annulus 653 in valve 484 and a passage 654.

Fuel at regulated pressure $P_r$ may be introduced to passage 646 via a passage 655 containing a spring loaded check valve 656 which passage 655 is vented to passage 641 at regulated pressure $P_r$ by a land portion 657 of valve 640. The valve 640 is connected to and actuated by a rod 658 one end of which rides in a slotted cam member 659 fixedly secured to and rotated by shaft 475. In response to certain conditions of operation of the exhaust nozzle gates 27, the cam member 659 is adapted to actuate valve 640 to a position whereby land portion 657 vents passage 655 to passage 641 whereupon check valve 656 is opened and fuel at regulated pressure $P_r$ communicated to passage 646 to cause rightward movement of valve 651 in the above mentioned manner.

The two position spool valve 484 is slidable in a bore 660 having reduced diameter end portions 661 and 662 which receive fuel at regulated servo pressure $P_r$ from passage 654 via annulus 653, a radial passage 663 and an axial passage 664 in valve 484. The axial passage 664 is provided with restrictions 665 and 666 which control flow to end portions 661 and 662, respectively. The end portions 661 and 662 are vented to the interior of casing 329 at drain fuel pressure $P_o$ via passages 667 and 668, respectively, which are provided with orifices 669 and 670 at the discharge ends thereof. A flapper 671 pivotally secured to casing 329 moves in one direction to open orifice 670 and close orifice 671 and in the opposite direction to close orifice 670 and open orifice 671. The flapper 671 is actuated by a follower 672 integral therewith which engages a first contoured portion of a cam 673 fixedly secured to shaft 546 and rotated by throttle lever 54. The valve 484 is provided with lands 674 and 675 which, in the position of valve 484 shown in FIGURE 6, are positioned to the right of passages 228 and 652, respectively, which permits passage 228 to communicate with passage 483 via annulus 676 in valve 484 and passage 654 to communicate with passage 652. With valve 484 positioned to the left, lands 674 and 675 block passages 228 and 652, respectively. A spring 677 interposed between casing 329 and valve 484 imposes a preload on valve 484 urging the same toward the left. The valve 484 is provided with opposite beveled end portions 678 and 679 which are engageable with their respective end portions 661 and 662 of bore 660 to thereby disestablish communication between the end portions 661 and 662 and passages 667 and 668, respectively.

OPERATION OF MAIN FUEL CONTROL

Assuming the engine 20 to be operating initially at a steady state idle speed, an acceleration to maximum speed without afterburner operation is accomplished in the following manner. The throttle lever 54 is actuated to its maximum speed position which causes rotation of cam 132 and a corresponding actuation of bell crank 129 in a counterclockwise direction as viewed in FIGURE 2 which, in turn, actuates follower 130 and attached rod 131 causing lever 114 to pivot clockwise. The clockwise movement of lever 114 results in ball valve 116 moving toward valve seat 117 thereby increasing fuel pressure $P_s$ which drives piston 109 toward the right as viewed in FIGURE 2 causing lever 107 to move out of engagement with abutment 111 whereupon follower 106 is urged into engagement with cam portion 99 by spring 110 bearing against lever 107. The follower 106 follows cam portion 99 which is contoured to provide a predetermined acceleration fuel schedule as a function of high pressure compressor speed $N_2$ and compressor inlet temperature $T_i$. The follower 106 drives roller 199 toward the left as viewed in FIGURE 2 thereby increasing the effective lever arm of lever 200 through which the force derived from bellows 203 acts causing the lever 200 to pivot clockwise against the opposing constant reference force derived from spring 207. The resulting increase in area of orifice 94 produces a drop in fuel pressure in chamber 89 causing movement of piston 87 and attached valve 84 and a corresponding increase in area of orifice 81 which, in turn, results in increased fuel to the combustion chambers 35. The roller 199′ moves with valve 84 causing an increase in the effective lever arm of lever 200 through which the constant reference force derived from spring 207 acts thereby balancing the opposing torque derived from bellows 203 acting through lever 200 which results in stabilization of piston 87.

As the engine accelerates in response to the increased fuel flow, the compressor discharge pressure $P_c$ increases and acts against bellows 203 causing a corresponding increase in the force applied through roller 199 to lever 200 which, in turn, results in a torque unbalance on lever 200 and corresponding clockwise movement of the same. As heretofore mentioned, clockwise movement of lever 200 results in upward movement of valve 84 and a corresponding increase in fuel flow to the combustion chambers 35. The roller 199' follows valve 84 until the effective lever arm of lever 200 through which the spring 207 acts produces a torque equal and opposite to the opposing torque derived from bellows 203 whereupon lever 200 is stabilized. At a predetermined maximum allowable compressor discharge pressure $P_c$, the bellows 214 overcomes the force of spring 218 and actuates lever 220 away from passage 221 to bleed the pressure in passage 206 downstream from the restriction 215 to atmospheric air pressure $P_a$ thereby limiting the air pressure $P_c$ acting against bellows 214 accordingly.

As the engine accelerates, the force of centrifugal weights 164 increases as a function of engine speed and unbalances lever 158 in a clockwise direction as viewed in FIGURE 2. The resulting increase in area of valve 157 results in a drop in pressure $P_s$ acting against piston 105 which moves to the left as viewed in FIGURE 2 causing shaft 102 and cams secured thereto to rotate as a function of compressor speed $N_2$. As the cams rotate, the follower 106 follows the contour of cam portion 99 and controls the movement of valve 84 to provide the desired acceleration fuel flow schedule to the combustion chambers 35. The follower 173 follows cam portion 100 and actuates lever 172 clockwise as viewed in FIGURE 2 which, in turn, drives roller 167 causing an increase in the effective lever arm of lever 158 through which the constant reference force derived from spring 165 acts in opposition to the force of centrifugal weights 164. Thus, the torque derived from centrifugal weights 164 acting through lever 158 is balanced by an equal and opposite torque derived from spring 165 acting through a variable lever arm of lever 158 which variable lever arm varies as a function of compressor speed $N_2$ through movement of piston 105 and cam portion 100. The compressor speed $N_2$ function imposed on cam portions 99 and 100 is modified as a function of compressor inlet temperature $T_i$ by piston 175 which actuates lever 178 to cause translation of cam portions 99 and 100. To this end, the bellows 190 expands with increasing temperature $T_i$ and actuates arm 186 counterclockwise as viewed in FIGURE 2 which, in turn, causes movement of lever 185 and a corresponding increase in area of valve 184. The increase in valve 184 area causes a reduction in fuel pressure $P_s$ acting against the larger area end of piston 175 which allows piston 175 to move downward under the influence of pressure $P_r$. The lever 185 follows the piston 175 and reduces the area of valve 184, thereby causing an increase in pressure $P_s$ whereupon piston 175 is stabilized. The lever 178 follows the piston 175 and translates cam portions 99 and 100 accordingly. A temperature error may be introduced in the bellows 190 by the tube 195 which is likely to be exposed exteriorly to ambient temperatures significantly lower or higher than the temperature at the compressor inlet probe attached thereto. To compensate for the ambient temperature effect on tube 195, the tube 194 which is not provided with a probe exposed to compressor inlet temperature $T_i$ like tube 195 but which is exposed to the ambient temperatures extends alongside tube 195 and connects to bellows 193 which has a volume equivalent to that of bellows 190. As the volume of bellows 193 increases in response to an increase in the temperature of tube 194, for example, the bell crank 192 is actuated clockwise as shown in FIGURE 2 causing the roller 187 to move down the beveled surface 188 of member 189 thereby reducing the effective length of cylindrical member 189 an amount equivalent to the axial expansion of bellows 190 which, like bellows 193, expands in response to the increased temperature of its tube 195. A decrease in the temperature to which tubes 194 and 195 are exposed results in counterclockwise movement of bell crank 192 and corresponding movement of roller 187 up the beveled surface 188 thereby increasing the effective length of member 189 an amount equivalent to the axial contention of bellows 190. If the ambient temperature to which the tubes 194 and 195 are exposed remains constant, the roller 187 will remain in position on beveled surface 188 and lever 186 will move in response to expansion of bellows 190 as a function of the compressor inlet temperature $T_i$ only.

The three dimensional cams 233 and 234 are rotated by rack 176 as a function of compressor inlet temperature $T_i$ in response to the actuation of piston 175. The cams 233 and 234 are translated by lever 237 in response to movement of piston member 240 as a function of compressor inlet pressure $P_i$. To this end, the bellows 248 responds to compressor inlet pressure $P_i$ causing lever 246 to pivot clockwise or counterclockwise depending upon the relative change in pressure $P_i$. For instance, bellows 248 will contract in response to an increase in pressure $P_i$ causing clockwise movement of lever 246 as viewed in FIGURE 3 which increases the area of valve 245 causing pressure $P_s$ on the longer side of piston 240 to decrease thereby upsetting piston 240 toward the left as viewed in FIGURE 2. The roller 252 follows piston 240 thereby increasing the effective lever arm through which the constant reference force derived from spring 241 acts in opposition to the bellows 248. The increase in effective lever arm results in a torque equal and opposite to the torque derived from bellows 248 acting through lever 246 whereupon the lever 246 is stabilized which, in turn, stabilizes the pressure $P_s$ as necessary to hold piston 240 motionless.

The follower 269 is shown in engagement with cam 233 whereas follower 270 is shown out of engagement with cam 234. However, during engine operation in the nonafterburning range as is the case in the engine acceleration under discussion, the chamber 261 is vented to drain pressure $P_o$ via restriction 260' by virtue of valve 563 being in the position shown in FIGURE 5 whereby passages 565 and 566 are blocked to prevent fuel at regulated pressure $P_r$ from flowing to chamber 261. With pressure $P_o$ in chamber 261, the piston 262 and roller 272 attached thereto are biased to the right by spring 274 permitting lever 268 to pivot clockwise under the influence of spring 272 thereby lifting follower 269 out of engagement with cam 233 and permitting follower 270 to engage cam 234. Thus, as the engine accelerates, the cam 132 is positioned axially by movement of casing 260 in response to the cam 234.

Referring now to the FIGURE 3 and the by-pass valve 282 which maintains a constant predetermined pressure differential $P_1-P_2$ across orifice 81, it will be understood that various conventional fuel by-pass valves may be substituted therefor. However, the by-pass valve 282 is adapted to eliminate some of the disadvantages of conventional spring loaded by-pass valves which are subject to error due to fluid pressure unbalance thereacross. To this end, the piston 301 reacts to a drop in pressure differential $P_1-P_2$ occasioned by an increase in area of orifice 81 and moves downward to decrease the effective flow area of valve 282 through which fuel at pressure $P_1$ flows to passage 283 at drain pressure $P_o$ thus decreasing the quantity of fuel by-passed. The bellows 293 responds to the aforementioned drop in $P_1-P_2$ pressure differential across orifice 81 and actuates lever 292 to cause an increase in area of valve 291 which, in turn, causes an increase in fuel pressure $P_s$ acting against piston 284. The pressure $P_s$ actuates piston 284 and valve 282 integral thereto downward against the resistance of spring 300 and in a closing direction until the force derived from the pressure differential $P_s-P_2$ acting against piston 284 is balanced by the force of spring 300 at which time the constant predetermined pressure differential $P_1-P_2$ exists across orifice 81. It will be noted that the reset action of piston 301 on spring 301 eliminates the spring error which would be introduced if the spring 301 was fixed at one end and progressively compressed by piston 284 as the fuel pressure $P_1$ and $P_2$ increased with the differential therebetween maintained constant. In the case of an increase in pressure differential $P_1-P_2$ across orifice 81, the abovementioned operation is reversed to thereby increase the by-pass flow as necessary to restore the constant predetermined pressure differential.

In the event of a malfunction of the aforementioned fuel control apparatus such that the fuel control functions impressed on metering valve 84 do not provide the desired fuel schedule to the engine, the emergency fuel control apparatus is brought into operation by means of a manual request or automatic switching means responsive to a condition of operation indicative of said malfunction. In such a case, the solenoid 326 is energized causing valve 325 to move to its open position whereby chamber 322 is vented to drain fuel pressure $P_0$ which, in turn, creates a pressure drop across restricted passage 323. The valve 303 is unbalanced to the right whereupon the left hand end of valve 303 blocks passage 78 and the right hand end of valve 303 diverts fuel at pressure $P_1$ into conduit 304. The effective flow area of conduit 304 and thus fuel flow through conduit 304 to conduit 44 which leads to combustion chambers 35 is controlled by the valve 305 in response to movement of throttle lever 54. The valve 305 is contoured to provide an emergency fuel flow schedule which has a relatively large safety margin so as to maintain a variable power output of the engine as a function of throttle lever 54 position without exceeding predetermined maximum allowable limits on engine speed, temperatures and/or pressures.

The fuel flow through conduit 304 is modified as a function of compressor inlet pressure $P_i$ by the by-pass valve 308 which regulates the pressure differential across valve 305. The by-pass valve 308 is positioned by diaphragm 310 in response to the differential between fuel pressure $P_1$ on the one side of diaphragm 310 and the fuel pressure $P_s$ on the opposite side of diaphragm 310 derived from fuel pressure $P_1$, the latter pressure $P_s$ being controlled by valve 313 in response to bellows 317 actuated by compressor inlet pressure $P_i$. The fuel pressure $P_s$ varies as a function of the area ratio of valve 313 and restriction 314 and, for each position of valve 313, assumes a value intermediate fuel pressures $P_1$ and $P_2$. For a given position of valve 305, the fuel pressure differential $P_1-P_2$ will be increased in response to an increase in compressor inlet pressure $P_i$ which acts to collapse bellows 317 accordingly causing valve 313 to open thereby causing a corresponding increase in fuel pressure $P_s$ which, in turn, actuates by-pass valve 308 toward a closed position to effect an increase in fuel pressure $P_1$. The combined forces of spring 311 and pressure $P_s$ acting against diaphragm 310 are balanced by an equal and opposite force derived from the increased fuel pressure $P_1$ acting against diaphragm 310 whereupon by-pass valve 308 is stabilized. A decrease in pressure $P_i$ will result in a decrease in pressure $P_s$ and a corresponding reduction in fuel pressure $P_1$.

The check valve 327 is urged to an open position in response to flow through conduit 304 at which time check valve 83 is urged to a closed position in response to the spring force applied thereto and fuel pressure $P_2$ downstream therefrom.

The cam portion 98 is contoured to provide a cam rise which decreases as a function of increasing speed $N_2$ such that, upon high pressure compressor speed $N_2$ approaching the requested maximum value, the follower 113 is displaced causing lever 114 to pivot counterclockwise as viewed in FIGURE 2. The servo valve 116 follows lever 114 and moves away from valve seat 117 causing a drop in pressure $P_s$ whereupon piston 109 moves to the left accordingly which allows lever 107 to engage abutment member 111. Continued movement of piston 109 to the left results in lever 107 pivoting counterclockwise about the point of contact with abutment member 111 thereby lifting follower 106 off cam portion 99 and actuating follower 106 away from cam portion 99. As piston 109 follows movement of servo valve 116, the lever 107 and attached follower 106 move accordingly until the follow-up motion of valve seat 117 relative to servo valve 116 re-establishes the pressure $P_s$ necessary to balance piston 109 at which time the lever 107 and follower 106 are stabilized. The movement of follower 106 results in movement of roller 199 toward the pivot point of lever 200 and a corresponding reduction in the lever arm through which the force derived from bellows 203 acts. The lever 200 is unbalanced in a counterclockwise direction causing a reduction in area of orifice 94 and a corresponding increase in pressures acting against piston 87 which actuates valve 84 in a closing direction thereby reducing fuel flow to the combustion chambers. The roller 199' follows valve 84 causing a reduction in the lever arm through which the force derived from spring 207 acts thereby stabilizing lever 200 which, in turn, effects stabilization of valve 84 and thus fuel flow to the combustion chambers such that the engine is governed at the requested high pressure compressor speed $N_2$.

The abutment member 111 may be adjusted toward or away from screw 112 to effect a corresponding variation in the ratio of lever arms defined by lever 107 coacting with abutment member 111 which, in turn, causes a corresponding change in the slope of the governor break, as desired. Reference is made to U.S. patent application Serial No. 92,876, filed March 2, 1961, in the name of Howard L. McCombs, Jr. (common assignee) for further details of operation of cam portions 98 and 99 and associated linkage mechanism.

OPERATION OF AFTERBURNER FUEL
CONTROL AND EXHAUST NOZZLE CONTROL

It will be understood that, prior to initiating afterburner operation, certain valves and associated structure of the afterburner fuel control 55 and exhaust nozzle control will occupy positions different from that shown in the drawings. For instance, referring to FIGURE 6, during nonafterburning operation the flapper will be held against orifice 670 by the cam 673, such that valve 484 occupies a position to the left against end portion 661 with lands 674 and 675 blocking passages 228 and 652, respectively. The ratchet member 548 will be held in a down position through levers 542 and 547 by the cam 545 whereby the ratchet 589 is out of engagement with and below the end portion 588 of lever 587. Likewise, the servo valve 555 and piston 557, as well as valve 563 attached to the latter, are at a down position whereby passage 567 in valve 563 is positioned below the adjacent end of passage 571 and valve 563 blocks passage 566 as well as passages 569, 570 and 571. Valve 622 attached to valve 563 is positioned accordingly, such that land 624 is below the adjacent end of passage 449 and the three passages 449, 625 and 626 are vented to passage 627. Valve 370 is urged to an open position by the fuel from pump 77 and fuel flows through passages 368 and 371 to valve 372 which is actuated to an open position thereby permitting fuel to flow to passage 373 from which fuel flows through restriction 366 and pressure regulating valve 333 to passages 331 and 336. The fuel shut-off valves 338, only one of which is shown, are pressurized to a closed position by the fuel flowing through associated restricted passages 447 and 448 and passages 449, 625 and 626. The valve 349 occupies a closed position whereby passage 348 is blocked preventing fuel at regulated pressure $P_r$ from reaching passage 350 which results in valve 345 being closed. The valve 349 is held in a closed position by regulated pressure $P_r$ which is admitted to chamber 352 in response to flapper valve 357 being biased against orifice 359 by lever 360 which is loaded counterclockwise by spring 363.

Now, assuming that the throttle lever 54 is actuated to the position requesting full afterburner operation, the following sequence will occur. The cam 673 wil rotate in response to movement of the throttle lever 54 causing flapper 671 to move away from orifice 670 into engagement with orifice 669 as shown in FIGURE 6 whereupon valve 484 is pressurized to the right by the fuel pressure $P_r$ acting against the total left hand end era of valve 484 in opposition to the force of spring 677 plus fuel pressure $P_r$ acting against the relatively small area of valve 484 exposed to end portion 662 plus the pressure $P_o$ acting against the remaining right hand end area of valve 484. Lands 674 and 675 are displaced away from passages 228 and 652, respectively, thereby establishing communication between passages 228 and 483 and between passages 654 and 652. However, referring to FIGURE 2, fuel at regulated pressure $P_r$ is not permitted to flow to passage 483 until a predetermined high pressure compressor speed $N_2$ is reached at which time the arm 232 carried by piston 105 engages lever 230 causing valve 227 to move upward, thereby communicating passage 226 with passage 228. The resulting flow through passage 228 and 483 permits pressurization of the various servo lines in afterburner fuel control 55 and exhaust nozzle control 70 which receive fuel at pressure $P_r$ from passage 483.

Referring to FIGURE 5, the cam 545, like cam 673, rotates with shaft 546 as a function of throttle lever 54 position. Valve 543 follows a depressed contour of cam 545 allowing lever 542 and attached lever 547 to pivot clockwise until the upper flat of ratchet 589 engages end portion 588 of lever 587 whereupon levers 542 and 547 are held stationary. Fuel at pressure $P_r$ flows through passages 560 and 559 to the bottom side of piston 557 thereby urging piston 557 and attached valve 563 upward to a position whereby passage 567 communicates with passage 571. As the piston 557 moves upward away from valve 555, the flow out of passage 556 increases causing a drop in fuel pressure at the bottom side of piston 557 and subsequent stabilization of piston 557. The valve 622 is actuated upward by valve 563 to a position whereby land 624 vents passage 449 to drain fuel pressure $P_o$. Venting passage 449 to drain fuel pressure $P_o$ results in a drop in pressure in chamber 445 whereupon shut-off valve 338 (FIGURE 4) opens in response to metered fuel pressure $P_3$ in conduit 336 thereby allowing fuel to flow to conduit 56 which, in turn, supplies afterburner fuel manifold 38. The afterburner fuel flow is ignited by conventional ignition means, not shown.

Referring to FIGURE 5, the lever 471 is pivoted counterclockwise about its connection with follower 473 in response to upward movement of lever 472 which follows the aforementioned upward movement of valve 563 causing valve 470 to move toward passage 462, thereby causing an increase in fuel pressure at the bottom side of piston 461. The piston 461 actuates spool valve 454 upward from the null position shown in FIGURE 5 thereby communicating passage 457 with passage 453 at high fuel pressure and passage 458 with passage 459 at drain fuel pressure which results in downward movement of piston 65 and opening movement of exhaust nozzle gates 27.

As the exhaust gates 27 are controlled in an opening direction, fuel flow to the afterburner fuel manifold 38 is controlled through piston 604 which rotates shaft 403 carrying cams 402, 451 and 452 (FIGURE 4a). The lever 472, in its upward movement, actuates lever 615 counter- clockwise about its connection 612. The stop 616 on lever 615 engages lever 611 urging the same counterclockwise about connection 612 against the resistance of spring 613. The valve 609 moves accordingly toward extension 608 causing a rise in servo fuel pressure against piston 604 which moves downwardly until stabilized by the follow-up action of extension 608 which moves away from valve 609 thereby reducing the servo fuel pressure acting against piston 604. The stops 616 and 617 establish limits on the position of piston 604 as a function of the position of throttle lever 54 between which limits the position of piston 604 is controlled as a function of the position of cam 474 through follower 610.

The position change of exhaust nozzle gates 27 results in feedback movement of flexible link 75 which rotates shaft 475 and fuel flow and nozzle correlation cam 474 secured thereto. The cam 474 actuates follower 473 causing lever 471 to pivot clockwise about its connection with lever 472, thereby moving valve 470 away from passage 462 which, in turn, results in a drop in fuel pressure at the bottom side of piston 461 and corresponding downward movement of spool valve 454 to its null position whereby the exhaust nozzle gates 27 are stabilized. The follower 610 is positioned by its corresponding portion of cam 474 and moves upward allowing lever 611 to pivot about connection 612 and under the influence of spring 613, engage follower 610 whereupon further movement of follower 610 results in pivotal movement of lever 611 about connection 612 between stops 616 and 617 which, in turn, positions valve 609 thereby causing downward movement of piston 604 and a corresponding rotation of cams 402, 451 and 452.

The cam portion 101 (FIGURE 2) schedules turbine pressure ratio as a function of speed $N_2$ and inlet temperature $T_1$ by actuating roller 517 to cause an increase or decrease in the effective lever arm of lever 514 through which the spring 519 acts, thereby upsetting valve 513 in a closing or opening direction depending upon the direction of movement of lever 514. The valve 513 controls the fuel pressure acting against piston 506 which moves accordingly to rotate cam 482 which, in turn, positions roller 495. The position of roller 495 determines the pressure ratio $P_{T4}/P_{T7}$ required to null the lever 489 and servo valve 488 secured thereto. The roller 530 attached to piston 506 provides a position feedback signal which results in a corresponding variation of the effective lever arm of lever 528 to cause a position change of valve 526 which, in turn, modifies the fuel pressure $P_s$ in bellows 515 accordingly to null the lever 514 loaded by bellows 515 in opposition to the spring 519 and thus null the valve 513 which, in turn, results in stabilization of piston 506.

If the area and fuel flow established by the aforementioned opening movement of exhaust nozzle gates 27 and downward movement of piston 604, respectively, as a function of the position of throttle lever 54 does not establish the pressure ratio $P_{T4}/P_{T7}$ required to null the lever 489 and servo valve 488, the pressure ratio sensing circuit which includes bellows 492 and 499 and associated linkage actuates the servo valve 488 toward an open or closed position depending upon the relative error in the pressure ratio $P_{T4}/P_{T7}$. For instance, assuming the pressure $P_{T7}$ downstream of turbine 30 to be in excess of that required to establish the required pressure ratio $P_{T4}/P_{T7}$, the lever 489 will be unbalanced in a counterclockwise direction thereby actuating valve 488 toward a closed position which, in turn, causes an increase in fuel pressure acting against piston 479 and movement toward the right, as viewed in FIGURE 5 of the same. The lever 477 is actuated counterclockwise about its connection with piston 633 by the piston 479 which results in rightward axial movement of cam 474 and subsequent movement of followers 473 and 610 to cause a modification of the area of exhaust nozzle gates 27 and fuel flow, respectively, which have the effect of decreasing pressure $P_{T7}$ thereby correcting the pressure ratio error. The spool valve 454 is nulled in response to feedback movement of flexible link 75 which results in rotation of cam 474. The piston 479 and piston 633 attached thereto via lever 477 provides proportional plus integral operation by means of which the cam 482 is actuated axially to actuate follower 502 and roller 495 attached thereto to a position which satisfies the null requirements of valve 488. The piston 479 provides proportional actuation and the piston 633 provides integrating actuation. Only one axial position of the cam 482 will effect nulling of the valve 481 which controls pressurization of integrator piston 633 which nulling must always occur therefore at the point corresponding to the selected pressure ratio $P_{T4}/P_{T7}$. The radial contour of cam 482 is constant, such that rotation of cam 482 does affect the position of follower 631. The velocity of the piston 633 is controlled in a conventional manner by controlling the flow of servo fuel thereto as will be readily understood by those persons skilled in the art.

Due to the time delay inherent in hydromechanical control mechanisms of the type under discussion whereby instantaneous control is not normally available, it is desired to initiate an increase in exhaust nozzle area slightly in advance of ignition of the afterburner fuel flow to thereby lead the resulting increase in pressure $P_{T7}$ downstream from turbine 30 and hold the pressure ratio $P_{T4}/P_{T7}$ relatively stable. To this end, the contour of cam 545 is such that, with ratchet 589 engaged with end portion 588 of lever 587 as mentioned heretofore, the valve 543 is permitted to move away from passage 541 thereby venting the same to drain pressure $P_0$ which, in turn, causes a drop in fuel pressure within bellows 538. The bellows 538 contracts thereby allowing lever 528' to contact the end of lever 528 which results in the force of spring 534 acting against lever 528 thereby augmenting the force of spring 529 which lever, in turn, is unbalanced in a counterclockwise direction. The resulting increase in load against bellows 523 results in a corresponding decrease in flow through tubular member 527 which, in turn, causes an increase in pressure in passage 524 leading to the interior of bellows 515 (FIGURE 2). The bellows 515 expands in response to the increase in pressure therein and unbalances lever 514 in a counterclockwise direction thereby decreasing the flow area of valve 513 which causes a corresponding increase in pressure against the upper side of piston 506 which moves downward as viewed in FIGURE 6 causing rack 505 to rotate shaft 503 and cam 482 attached thereto. The roller 530 moves with rack 505 and decreases the effective lever arm of lever 528 through which the spring 529 acts thereby balancing the opposing torques derived from bellows 523 and spring 534 which results in stabilization of lever 154 and attached valve 513 which, in turn, stabilizes the fuel pressure acting against piston 506 thereby stabilizing the same.

The cam 482 rotates in response to movement of piston 506 and urges follower 502 upwardly causing an increase in the effective lever arm of lever 489 through which bellows 499 acts and subsequent counterclockwise motion of lever 489 which results in closing movement of valve 488 and a corresponding rise in fuel pressure against the one side of proportionally acting piston 479. The proportionally acting piston 479 moves to the right causing lever 477 to pivot clockwise about its connection with piston 633 and actuate shaft 475 and cam 474 attached thereto to the right. Also, the piston 479 actuates cam 482 to the right causing follower 502 to move downward in response to a depressed contour of cam 482.

The piston 604 is urged downward by the increase in fuel pressure at the top side thereof. Rack 412 attached to piston 604 rotates pinion 413 causing shaft 403 and cams 402, 451 and 452 to rotate correspondingly. It will be understood that fuel is being supplied to afterburner manifold 38 only at this time since shut-off valves 338 associated with afterburner fuel manifolds 39 and 40 are closed. The cams 402, 451 and 452 are rotated clockwise looking from the driven end of shaft 403 and are provided with a rising radial contour. Cam 402 rotates driving follower 401 upward which causes cam member 399 to pivot counterclockwise thereby lifting follower 394 which, in turn, pivots lever 390 causing valve 386 to move away from passage 387 in valve 334 which results in a drop in fuel pressure $P_x$ in chamber 381 and subsequent movement of valve 334 in an opening direction. As valve 334 moves in an opening direction, passage 387 moves toward valve 386 thereby causing an increase in pressure $P_x$ in chamber 381 and subsequent stabilization of valve 334. The bellows 438 responds to the drop in fuel pressure differential across valve 334 caused by opening movement thereof and actuates valve 437 away from passage 436 causing a drop in fuel pressure $P_x$ at the face 430 of piston 429 thereby actuating valve 335 in an opening direction to re-establish the predetermined constant pressure differential across valve 334 at which time the valve 335 is stabilized.

The shaft 403 and thus cams 402, 451 and 452 are positioned axially as a function of the inlet temperature sensed by probe 61 which axial movement of cam 402 results in corresponding movement of valve 386 and valve 334 controlled thereby in the above mentioned manner. The position of valve 386 and thus metering valve 334 is modified as a function of compressor inlet pressure $P_i$ which, in an increasing pressure sense, causes bellows 420 to expand thereby opening valve 418 and decreasing the fuel pressure $P_s$ acting on piston 417 which moves to the right causing counterclockwise movement of lever 414 until the lever 419 and valve 418 attached thereto is stabilized by the follow-up motion of roller 422 attached to piston 417. The movement of lever 414 results in translatory motion of follower 394 which rotates on shaft 373 in response to the arm 398 following the inclined surface of ramp 399. The rotation of follower 394 results in actuation of lever 390 and corresponding movement of valve 386 and metering valve 334.

Referring back to FIGURE 5 and piston 479 which moves to the right in the aforementioned manner, it will be noted that bracket 580 which moves with piston 479 is adapted to engage screw member 579 thereby pivoting lever 578 clockwise causing valve 577 to move away from passage 576 thereby venting the one side of piston 573 to drain fuel pressure $P_0$ whereupon the piston 573 is pressurized to the right against spring 574 by fuel at regulated pressure $P_r$ acting on the opposite side of piston 573. Movement of piston 573 results in valve 582 integral therewith communicating passage 583 at regulated pressure $P_r$ with passage 584 leading to piston 585 which is pressurized against the spring bearing thereagainst causing stem 586 to engage lever 587 which, in turn, is pivoted counterclockwise causing end portion 588 to release ratchet 589 which permits levers 547 and 542 to pivot clockwise. The valve 555 attached to lever 547 moves toward passage 556 causing an increase in pressure at the bottom side of piston 557 whereupon piston 557 moves upward displacing valve 563 accordingly. The passage 567 in valve 563 moves out of engagement with passage 571 causing the fuel pressure at the left hand side of piston 573 to drop by virtue of the bleed passage 576 which vents passage 572 to drain fuel pressure $P_0$. The piston 573 is biased to the left by spring 574 whereupon valve 582 disestablishes communication between passages 583 and 584 and vents passage 584 to drain fuel pressure $P_0$. The resulting drop in fuel pressure against piston 585 permits retraction of stem 586, allowing lever 587 to pivot clockwise causing end portion 588 thereof to engage the upper flat of ratchet 590 as shown in FIGURE 5 which fixes the position of lever 547 and valve 555 attached thereto. The piston 557 and valve 563 attached thereto assume a position in accordance with the fixed position of valve 555 such that passage 567 communicates with passage 570 thereby venting fuel at regulated pressure $P_r$ to passage 575 leading to piston 573.

The valve 622 follows the movement of valve 563 and moves to a position whereby land 624 vents passage 625 to drain fuel pressure $P_o$ which results in shut-off valve 338 in box 341 (FIGURE 4) opening thereby allowing fuel to flow to conduit 57 leading to afterburner fuel manifold 39. Fuel flow to the manifold 39 is controlled by valves 334 and 335 in box 341 in response to cam 451 in the manner described heretofore in regard to the valves 334 and 335 and cam 402 associated with afterburner fuel manifold 38. The piston 604 which actuates cams 402, 451 and 452 is positioned by movement of valves 609 in response to the aforementioned upward movement of valve 563 which also results in upward movement of lever 572 and a corresponding actuation of valve 470 which, in turn, results in actuation of exhaust nozzle gates 27 in the manner heretofore mentioned.

The increase in area of exhaust nozzle gates 27 as well as the increase in fuel flow to the afterburner section via fuel manifold 39 results in a $P_{T7}$ pressure change which upsets the lever 489 causing valve 488 to move toward a closed position which, in turn, results in rightward movement of piston 479 in the manner heretofore mentioned whereupon lever 578 is again actuated causing valve 577 to open, thereby pressurizing piston 573 to the right which, in turn, results in pressurization of piston 585 and subsequent unlatching of ratchet 590 and latching of ratchet 591 in the manner heretofore described with regard to ratchets 589 and 590. The piston 573 is pressurized to the left in response to upward movement of valve 563 brought about by unlatching ratchet 590 and subsequent repositioning of valve 555 which controls the position of valve 563. As before, upward movement of valve 563 results in upward movement of valve 622, lever 472 and actuation of valve 609. The valve 622 moves to a position whereby land 624 thereof vents passage 626 to drain fuel pressure $P_o$ thereby causing shut-off valve 338 in box 342 to open allowing fuel to flow to conduit 58 which, in turn, supplies afterburner fuel manifold 40. Fuel flow to manifold 40 is scheduled by valves 334 and 335 in box 342 in accordance with the cam 452 which, like cams 402 and 451, is rotated by piston 604. The movement of valve 563 to the last mentioned position results in passage 564 therein communicating passage 565 at regulated fuel pressure $P_r$ with passage 566 leading to passage 275 (FIGURE 2) which communicates with chamber 261 wherein the fuel pressure $P_r$ actuates piston 262 to the position shown in FIGURE 2. The roller 272 moves with piston 262 to the position shown whereby lever 268 is urged away from arm 265 causing follower to engage cam 233 which results in follower 270 being lifted off cam 234. The casing 260 is pivotally actuated by follower 269 causing cam 132 to move axially as a function of the contour impressed on cam 233.

Upon reaching a predetermined fuel flow rate through conduit 331, the afterburner fuel pump 60 is brought into operation to supply the fuel flow needs of the afterburner fuel manifolds 38, 39 and 40. To this end, a predetermined fuel pressure drop generated across restriction 366 acts against diaphragm 362 urging the same against spring 363 which results in actuation of lever 360 and flapper valve 357 attached thereto to the position shown in FIGURE 4 whereby the chamber 352 is vented to drain fuel pressure $P_o$. The piston 351 and valve 349 integral therewith are biased against spring 356 to the position shown in FIGURE 4 with piston 351 abutting stop 355. The piston 351 is held against stop 355 by the regulated fuel pressure $P_r$ acting thereagainst and the drain fuel pressure $P_o$ acting against the end of valve 349 in opposition to the drain fuel pressure $P_o$ in chamber 352 and the spring 356. The fuel at regulated pressure $P_r$ flows from passage 348 through valve 349 to passage 350 thereby pressurizing valve 345 to an open position which allows fuel to flow to the inlet of pump 60. The high pressure fuel discharged by pump 60 flows through passage 378 to piston portion 377 actuating valve 372 to a closed position thereby shutting off fuel flow from pump 76' through conduit 371. The check valve 332 opens in response to the pressure of the fuel discharged by pump 60 and fuel flows therethrough to conduit 331.

The exhaust nozzle feedback pulley 74 is spring loaded, not shown, such that, in the event of a broken flexible link 75, the pulley 74 will be actuated causing shaft 475 and cam 659 secured thereto to rotate to a position whereby the end of the slot in cam 659 engages rod 658 actuating the same downward to vent passage 641 at regulated fuel pressure $P_r$ to passage 655 whereupon check valve 656 opens allowing fuel to flow through passage 646 to the one side of land 648 causing valve 561 to move to the right to disestablish communication between passage 562 and 560 and vent passage 560 to passage 650 at drain fuel pressure $P_o$. Movement of valve 561 to the right results in tapered portion 651 moving away from passages 652 thereby introducing a second source of fuel at regulated pressure $P_r$ to said one side of land 648 which results in the valve 561 being pressurized to the right irrespective of the position of valve 640. The passage 560 being vented to drain fuel pressure $P_o$ results in depressurization of the piston 604 which moves upward thereby effecting rotation of cams 402, 451 and 452 and a corresponding decrease in fuel flow to the afterburner fuel manifolds 38, 39 and 40, depressurization of piston 557 whereupon valve 563 and valves and levers actuated thereby are moved downward. The valve 622 moves to a position whereby passage 627 at regulated fuel pressure is communicated with passages 449, 625 and 626 which results in each of the three shut-off valves 338 being pressurized to a closed position to thereby shut off fuel flow to afterburner fuel manifolds 38, 39 and 40, respectively. The lever 472 moves downward with valve 563 causing valve 470 to move away from passage 462 causing valve 454 to move downward venting passage 453 to passage 458 thereby pressurizing piston 65 in a direction to close exhaust nozzle gates 27. As a result of the abovementioned action, the afterburner fuel control 55 and exhaust nozzle control 70 is rendered inoperative irrespective of the position of throttle lever 54 which may or may not be actuated to a position requesting afterburner operation until the broken flexible linkage 75 is replaced or otherwise rendered operative to provide the intended feedback function.

In the event of afterburner blowout the governor mechanism is reset to reduce fuel flow to the combusion chambers 35. Following afterburner blowout the pressure ratio $P_{T4}/P_{T7}$ will increase as a result of the drop in pressure $P_{T7}$ which via bellows 499 results in upsetting lever 489 from a null position to cause valve 488 to open which in turn, results in pressurization of piston 479 to the left whereupon bracket 580 engages retaining member 644. The retaining member 644 is urged against the spring bearing thereagainst allowing lever 643 to pivot counterclockwise under the influence of regulated fuel pressure $P_r$ acting against the end of valve 638 which valve opens communicating passage 639 at regulated fuel pressure $P_r$ with passage 636. From passage 636 fuel flows through passage 635 to passage 148 and to the one side of piston 144 which moves upward driving rod 143 against arm 141 which contacts fixed stop 142 thereby positioning stop member 139 accordingly. Stop member 139 engages flange 140 thereby driving rod 131 to the left causing lever 114 to pivot counterclockwise as viewed in FIGURE 2 which, in turn, positions valve 116 causing piston 109 to move to the left. The piston 109 carries lever 107 which pivots counterclockwise about abutment 111 driving follower 106 toward the right which results in movement of roller 199 and subsequent upsetting of lever 200 in a counterclockwise direction as viewed in FIGURE 3. The valve 94, in turn, moves toward a closed position causing an increase in fuel pressure in chamber 89 and subsequent closing movement of valve 84. The roller 199' follows valve 84 reducing the effective lever arm through which spring 207 acts thereby balancing lever 200. Referring to FIGURE 3, it will be noted that the abovementioned movement of rod 131 results in movement of follower 130 which actuates bellcrank 129 clockwise driving rod 128 downwardly. The rod 128 is provided with a collapsible link 128' which includes a spring 129'. The one portion of rod 128 moves downward against the resistance of spring 129' and the remaining portion of rod 128 which bears against cam 132 remains fixed in position.

Also, opening movement of valve 638 results in flow of fuel from passage 636 through check valve 647 to passage 646 whereupon valve 651 is pressurized to the right as in the case of a broken flexible link 75 heretofore described to thereby effect depressurization of the afterburner fuel control 55 and exhaust nozzle control 70 and render the same inoperative. It will be understood that afterburner operation as well as exhaust nozzle operation is not available until the throttle lever 54 is repositioned to a nonafterburning position at which time the valve 484 is actuated to the left in response to movement of cam 673 whereupon land 675 blocks passage 652 and land 674 blocks passage 228 to shut off the flow of fuel at regulated pressure $P_r$ to the various control circuits of the afterburner fuel control 55 and exhaust nozzle control 70. The land 648 is depressurized allowing valve 651 to close thereby providing for reactivation of the afterburner fuel control 55 and exhaust nozzle control 70 in the event of a subsequent request for afterburner operation.

The aforementioned step control of valve 563 by lever 587 which moves into and out of engagement with ratchets 589, 590 and 591 is repeated in the opposite downward direction of movement of valve 563 by lever 592 during an engine deceleration through the afterburning range of operation. To illustrate the operation of lever 592, it will be assumed that the throttle lever 54 is actuated from the position requesting full afterburner operation to a position in the nonafterburning range thereby causing cam 545 to rotate which, in turn, urges valve 543 to a closed position causing lever 542 to pivot counterclockwise as viewed in FIGURE 5. The lever 547 pivots about its connection with ratchet member 548 thereby carrying valve 555 away from passage 556 which, in turn, results in downward movement of piston 557 and valve 563 attached thereto. The ratchet member 548 which, in the full afterburner operation, is in the aforementioned up position will be held temporarily in the up position regardless of the counterclockwise movement of lever 542 by the end portion 593 of lever 592 which engages the lower flat of ratchet 591. The valve 563 moves downward to a position depending upon the position of valve 555 which is held stationary temporarily by the action of ratchet member 548. The rod 472 follows valve 563 causing valve 470 to move away from passage 462 which results in corresponding downward movement of spool valve 454 and subsequent closing movement of exhaust nozzle gates 27. The feedback motion of link 75 rotates cam 474 which, in turn, actuates lever 471 causing movement of valve 470 towards passage 462 to thereby urge spool valve 454 to its null position thereby stabilizing exhaust nozzle gates 27. The rotation of cam 474 also results in simultaneous control of afterburner fuel flow by virtue of actuation of follower 610 which pivots lever 611 clockwise causing valve 609 to move away from passage 607 thereby effecting a reduction in fuel pressure on piston 604 which moves upward toward valve 609 until valve 609 coacts with the passage 607 to re-establish the fuel pressure necessary to stabilize piston 604. The rack 312 moves with piston 604 causing shaft 403 and cams 402, 451 and 452 attached thereto to rotate which, in turn, results in a reduction of fuel flow to the respective afterburner fuel manifolds 38, 39 and 40.

As the rack 412 moves, the raised portion 601 on the extension thereof engages and releases the end of lever 600 causing valve 599 to open and close which temporarily introduces fuel at regulated pressure $P_r$ to spring loaded piston 596 which via stem 594 urges lever 592 counterclockwise thereby releasing ratchet 591 allowing ratchet member 548 to move downward until lever 592 engages the lower flat of ratchet 590 thereby fixing the position of ratchet member 548 accordingly. When valve 599 closes by virtue of raised portion 601 moving out of engagement therewith, the fuel pressure against piston 596 decreases to drain pressure $P_o$ which permits retraction of stem 594 to thereby allow lever 592 to move clockwise into engagement with ratchet 590.

The valve 563 is repositioned in accordance with the movement of valve 555 attached to lever 547 as ratchet member 548 moves to its new position. The spool valve 622 follows valve 563 permitting land 624 to move beyond passage 626 thereby venting passage 627 to passage 626 which results in pressurizing cut-off valve 338 associated with afterburner fuel manifold 40 to a closed position to disestablish fuel flow to manifold 40.

As pointed out heretofore, motion of valve 563 results in movement of rod 472 in a direction to decrease the area of exhaust nozzle gates 27 and the resulting position feedback motion of cam 474 tends to null the spool valve 454 which responds to movement of valve 470 attached to lever 471. The cam 474 controls the movement of follower 610 which, in turn, controls the position of valve 609 which, as pointed out heretofore, controls the upward movement of piston 604. As in the case of raised portion 601, movement of rack 412 results in engagement of raised portions 602 and 603 in sequence with lever 600 to effect release and engagement of lever 592 with ratchet 590 and 589, in turn, results in control the movement of valve 563 which, in turn, results in sequential disestablishment of fuel flow to the afterburner fuel manifolds 38, 39 and 40 thereby providing step reduction in fuel flow to the afterburner section.

During engine start and idle operation, the exhaust nozzle gates 27 are actuated to a wide open position to reduce engine thrust to a minimum for ground operation. To this end, the valve 467 is actuated to a closed position by solenoid 467' which is electrically energized by a switch, not shown, similar to switch 152 at throttle lever 54 positions corresponding to idle and engine start. With the valve 467 closed, the lower side of piston 461 is pressurized causing the piston to move upward thereby venting passage 453 to passage 457 which, in turn, results in pressurization of piston 65 and movement of exhaust nozzle gates 27 to a full open position. The solenoid 467' may be wired to a second switch, not shown, actuated by the aircraft landing gear, for instance, to prevent energization of solenoid 467' and subsequent opening movement of nozzle gates 27 during normal flight operation when the landing gear is up and full opening movement of the nozzle gates 27 is undesirable.

It will be apparent to those persons skilled in the art that various changes in the form and relative arrangement of parts may be made to suit requirements of a particular system. Also, ordinary engineering skill and technique may be utilized to provide access means for removing and replacing parts within the various casings or for making adjustments and the like to the mechanisms. Conventional fluid seals may be used where required to seal one fluid pressure from another.

What is claimed is:

1. Fuel flow control apparatus for a gas turbine engine provided with an air compressor, an afterburner, a plurality of afterburner fuel manifolds connected to discharge fuel into said afterburner and a control lever for controlling the operation of the engine, said fuel flow control apparatus comprising:
- a source of pressurized fuel;
- a separate conduit connected to supply fuel from said source to each of the fuel manifolds;
- first valve means in each of said conduits for controlling the effective flow area thereof and thus fuel flow therethrough;
- second valve means in each of said conduits responsive to the fuel pressure drop across said first valve means for controlling said fuel pressure drop;
- a fuel shut-off valve in each of said fuel conduits for blocking fuel flow therethrough to the associated manifold;
- separate means operatively connected to each of said first valve means for controlling the operation thereof;
- first means responsive to a variable condition of engine operation related to engine power ouput operatively connected to said separate means for actuating the same;
- second means responsive to a variable condition of engine operation related to engine power ouput operatively connected to said separate means for actuating the same;
- third means responsive to the position of the control lever operatively connected to said separate means for actuating the same;
- means responsive to the position of the control lever operatively connected to said fuel shut-off valves for actuating the same; and
- control means operatively connected to said last named means for controlling movement thereof in a series of steps to cause said fuel shut-off valves to open in sequence.

2. Fuel flow control apparatus for a gas turbine engine as claimed in claim 1 wherein:
- said first means is responsive to compressor inlet air temperature; and
- said second means is responsive to compressor discharge air pressure.

3. Fuel flow control apparatus for a gas turbine engine as claimed in claim 1 wherein:
- said second valve means is operative to control the fuel pressure drop across said first valve means to a predetermined constant value.

4. Fuel flow control apparatus for a gas turbine engine as claimed in claim 1 wherein said source of pressurized fuel includes:
- a fuel supply conduit;
- a first engine driven relatively low capacity fuel pump operatively connected to said fuel supply conduit for pressurizing fuel therein;
- a second engine driven relatively high capacity fuel pump operatively connected to said fuel supply conduit in parallel flow relationship with said first pump for pressurizing fuel in said fuel supply conduit;
- third valve means operatively connected to said fuel supply conduit for shutting off fuel flow to the inlet of said second fuel pump; and
- means responsive to the rate of fuel flow passing through said fuel supply conduit to said separate conduits operatively connected to said third valve means for actuating the same to an open position in response to a predetermined rate of fuel flow.

5. Fuel flow control apparatus for a gas turbine engine as claimed in claim 4 wherein said means responsive to the rate of fuel flow passing through said fuel supply conduit includes:
- a restriction in said fuel supply conduit;
- means responsive to the fuel pressure differential across said restriction;
- fluid pressure operated servo means operatively connected to said third valve means for actuating the same; and
- servo valve means operatively connected to said pressure differential responsive means for controlling the fluid pressure to which said fluid pressure operated servo means responds.

References Cited by the Examiner

UNITED STATES PATENTS

| | | | |
|---|---|---|---|
| 2,938,341 | 5/1960 | Miller | 60—39.28 |
| 2,988,883 | 6/1961 | Corbett | 60—39.28 |
| 3,174,281 | 3/1965 | Zeisloft | 60—35.6 |

JULIUS E. WEST, *Primary Examiner.*